US008659529B2

(12) United States Patent
Kimura et al.

(10) Patent No.: US 8,659,529 B2
(45) Date of Patent: Feb. 25, 2014

(54) CURRENT SOURCE CIRCUIT, A SIGNAL LINE DRIVER CIRCUIT AND A DRIVING METHOD THEREOF AND A LIGHT EMITTING DEVICE

(75) Inventors: Hajime Kimura, Kanagawa (JP); Jun Koyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 586 days.

(21) Appl. No.: 10/756,756

(22) Filed: Jan. 14, 2004

(65) Prior Publication Data

US 2004/0232952 A1 Nov. 25, 2004

(30) Foreign Application Priority Data

Jan. 17, 2003 (JP) .................................. 2003-010427

(51) Int. Cl.
 *G09G 3/36* (2006.01)
(52) U.S. Cl.
 USPC .......................................... 345/98; 345/100
(58) Field of Classification Search
 USPC ........... 345/55, 60, 63, 64, 67, 76–80, 82, 89, 345/91–96, 98, 99, 100, 103, 204–206, 345/208–213, 690, 691; 315/167, 168, 315/169.1–169.3; 323/315
 See application file for complete search history.

(56) References Cited

U.S. PATENT DOCUMENTS

| | | | | | |
|---|---|---|---|---|---|
| 3,696,393 | A | * | 10/1972 | McDonald | 345/82 |
| 3,982,172 | A | * | 9/1976 | van de Plassche | 323/317 |
| 4,967,140 | A | * | 10/1990 | Groeneveld et al. | 323/315 |
| 5,016,070 | A | * | 5/1991 | Sundaresan | 257/302 |
| 5,138,310 | A | * | 8/1992 | Hirane et al. | 345/82 |
| 5,266,936 | A | * | 11/1993 | Saitoh | 345/98 |
| 5,594,463 | A | * | 1/1997 | Sakamoto | 345/76 |
| 5,619,228 | A | * | 4/1997 | Doherty | 345/693 |
| 5,680,149 | A | * | 10/1997 | Koyama et al. | 345/98 |
| 5,719,589 | A | * | 2/1998 | Norman et al. | 345/82 |
| 5,805,123 | A | * | 9/1998 | Satoh et al. | 345/60 |

(Continued)

FOREIGN PATENT DOCUMENTS

| | | |
|---|---|---|
| CN | 1 041 230 | 4/1990 |
| EP | 0359315 | 3/1990 |

(Continued)

OTHER PUBLICATIONS

Reiji Hattori et al.; "Circuit Simulation of Poly-Si TFT Based Current-writing Active-Matrix Organic LED Display"; *Technical Report of IEIECE*, ED2001-8, SDM2001-8; The Institute of Electronics, Information and Communication Engineers, pp. 7-14; 2001.

(Continued)

*Primary Examiner* — Amare Mengistu
*Assistant Examiner* — Sarvesh J Nadkarni
(74) *Attorney, Agent, or Firm* — Fish & Richardson P.C.

(57) ABSTRACT

A current source circuit includes current sources that are each configured to receive an external set signal and to control an output current value based on the external set signal. A changing over circuit that is electrically connected to the current sources and a set of output lines selects one of the current sources to be electrically connected to each of the output lines.

8 Claims, 18 Drawing Sheets

(56) References Cited

U.S. PATENT DOCUMENTS

| | | | |
|---|---|---|---|
| 5,923,309 A * | 7/1999 | Ishizuka et al. | 345/82 |
| 5,942,856 A * | 8/1999 | Koyama | 315/169.3 |
| 5,953,003 A * | 9/1999 | Kwon et al. | 345/204 |
| 5,973,661 A * | 10/1999 | Kobayashi et al. | 345/100 |
| 5,990,629 A * | 11/1999 | Yamada et al. | 315/169.3 |
| 6,020,865 A * | 2/2000 | Okuda et al. | 345/82 |
| 6,037,888 A * | 3/2000 | Nairn | 341/145 |
| 6,057,183 A * | 5/2000 | Koyama et al. | 438/166 |
| 6,091,203 A * | 7/2000 | Kawashima et al. | 315/169.3 |
| 6,150,877 A * | 11/2000 | Morikawa | 327/565 |
| 6,222,357 B1 * | 4/2001 | Sakuragi | 323/315 |
| 6,229,506 B1 * | 5/2001 | Dawson et al. | 345/82 |
| 6,268,842 B1 * | 7/2001 | Yamazaki et al. | 345/99 |
| 6,310,589 B1 * | 10/2001 | Nishigaki et al. | 345/76 |
| 6,331,830 B1 * | 12/2001 | Song et al. | 341/121 |
| 6,331,844 B1 * | 12/2001 | Okumura et al. | 345/87 |
| 6,339,391 B1 * | 1/2002 | Chung et al. | 341/153 |
| 6,344,843 B1 * | 2/2002 | Koyama et al. | 345/100 |
| 6,351,076 B1 * | 2/2002 | Yoshida et al. | 315/169.1 |
| 6,369,516 B1 * | 4/2002 | Iketsu et al. | 315/169.3 |
| 6,369,786 B1 * | 4/2002 | Suzuki | 345/77 |
| 6,373,454 B1 * | 4/2002 | Knapp et al. | 345/76 |
| 6,465,806 B2 * | 10/2002 | Kubota et al. | 257/72 |
| 6,473,064 B1 * | 10/2002 | Tsuchida et al. | 345/82 |
| 6,501,466 B1 * | 12/2002 | Yamagishi et al. | 345/204 |
| 6,545,651 B2 * | 4/2003 | Nishigaki et al. | 345/76 |
| 6,545,652 B1 * | 4/2003 | Tsuji | 345/82 |
| 6,559,836 B1 * | 5/2003 | Mori | 345/204 |
| 6,586,888 B2 * | 7/2003 | Kitahara et al. | 315/169.1 |
| 6,590,516 B2 * | 7/2003 | Inagaki et al. | 341/144 |
| 6,606,080 B2 | 8/2003 | Mukao | |
| 6,633,284 B1 * | 10/2003 | Hanari | 345/204 |
| 6,667,580 B2 * | 12/2003 | Kim et al. | 315/169.3 |
| 6,693,385 B2 * | 2/2004 | Koyama | 315/169.1 |
| 6,714,091 B2 * | 3/2004 | Norskov et al. | 331/185 |
| 6,747,624 B1 * | 6/2004 | Udo et al. | 345/89 |
| 6,753,880 B2 * | 6/2004 | Kudo et al. | 345/690 |
| 6,756,951 B1 * | 6/2004 | Ishizuka et al. | 345/82 |
| 6,760,004 B2 * | 7/2004 | Koyama | 345/98 |
| 6,777,710 B1 * | 8/2004 | Koyama | 257/59 |
| 6,777,885 B2 * | 8/2004 | Koyama | 315/169.1 |
| 6,801,061 B2 * | 10/2004 | Cowles | 327/108 |
| 6,809,320 B2 * | 10/2004 | Iida et al. | 250/338.4 |
| 6,850,216 B2 * | 2/2005 | Akimoto et al. | 345/90 |
| 6,876,345 B2 * | 4/2005 | Akimoto et al. | 345/76 |
| 6,876,350 B2 * | 4/2005 | Koyama | 345/92 |
| 6,909,442 B2 * | 6/2005 | Hiyama et al. | 345/690 |
| 6,914,390 B2 * | 7/2005 | Koyama | 315/169.3 |
| 6,919,870 B2 | 7/2005 | Fukuda | |
| 6,924,601 B2 * | 8/2005 | Date | 315/169.1 |
| 6,927,753 B2 * | 8/2005 | Koyama et al. | 345/100 |
| 6,952,194 B1 * | 10/2005 | Yamazaki et al. | 345/92 |
| 6,952,228 B2 * | 10/2005 | Yoneda et al. | 348/308 |
| 6,954,035 B2 * | 10/2005 | Chien et al. | 315/169.4 |
| 6,963,336 B2 * | 11/2005 | Kimura | 345/204 |
| 7,365,714 B2 * | 4/2008 | Yoo | 345/76 |
| 2001/0048408 A1 * | 12/2001 | Koyama et al. | 345/76 |
| 2001/0048410 A1 * | 12/2001 | Nishigaki et al. | 345/82 |
| 2002/0014628 A1 * | 2/2002 | Koyama | 257/72 |
| 2002/0047581 A1 * | 4/2002 | Koyama | 315/169.3 |
| 2002/0057244 A1 * | 5/2002 | Koyama et al. | 345/87 |
| 2002/0135309 A1 * | 9/2002 | Okuda | 315/169.1 |
| 2002/0135313 A1 * | 9/2002 | Koyama | 315/169.3 |
| 2002/0149608 A1 * | 10/2002 | Bu et al. | 345/690 |
| 2002/0180369 A1 * | 12/2002 | Koyama | 315/169.1 |
| 2003/0048669 A1 * | 3/2003 | Abe | 365/189.09 |
| 2003/0128199 A1 * | 7/2003 | Kimura | 345/204 |
| 2003/0128200 A1 * | 7/2003 | Yumoto | 345/211 |
| 2003/0156012 A1 * | 8/2003 | Omidi et al. | 340/310.01 |
| 2003/0156102 A1 * | 8/2003 | Kimura | 345/204 |
| 2003/0169250 A1 * | 9/2003 | Kimura | 345/212 |
| 2004/0008074 A1 | 1/2004 | Takehara et al. | |
| 2004/0085029 A1 * | 5/2004 | Kimura | 315/291 |
| 2004/0085270 A1 * | 5/2004 | Kimura | 345/82 |
| 2004/0207578 A1 * | 10/2004 | Koyama | 345/76 |
| 2004/0222985 A1 * | 11/2004 | Kimura | 345/212 |
| 2004/0232952 A1 | 11/2004 | Kimura et al. | |
| 2004/0239599 A1 * | 12/2004 | Koyama | 345/76 |
| 2004/0239607 A1 * | 12/2004 | Koyama | 345/98 |
| 2004/0239654 A1 * | 12/2004 | Okuda | 345/204 |
| 2004/0257356 A1 * | 12/2004 | Koyama | 345/204 |
| 2004/0263437 A1 * | 12/2004 | Hattori | 345/76 |
| 2005/0002260 A1 * | 1/2005 | Koyama | 365/222 |
| 2006/0028413 A1 * | 2/2006 | Kimura | 345/82 |
| 2008/0174527 A1 * | 7/2008 | Hattori | 345/75 |

FOREIGN PATENT DOCUMENTS

| | | | |
|---|---|---|---|
| EP | 0 718 816 A2 | 6/1996 | |
| EP | 1 063 630 | 12/2000 | |
| EP | 1 102 234 | 5/2001 | |
| EP | 1202242 | 5/2002 | |
| EP | 1 274 065 A2 | 1/2003 | |
| EP | 1486942 | 12/2004 | |
| EP | 1577869 | 9/2005 | |
| JP | 62-122488 | 8/1987 | |
| JP | 02-105907 | 4/1990 | |
| JP | 02-189579 | 7/1990 | |
| JP | 05-042488 | 10/1993 | |
| JP | 06-118913 | 4/1994 | |
| JP | 07-036410 | 2/1995 | |
| JP | 08-095522 | 4/1996 | |
| JP | 08-101669 | 4/1996 | |
| JP | 08-106075 | 4/1996 | |
| JP | 09-081087 | 3/1997 | |
| JP | 09-134149 | 5/1997 | |
| JP | 09-244590 | 9/1997 | |
| JP | 09-244590 A | 9/1997 | |
| JP | 10-083166 | 3/1998 | |
| JP | 10-312173 | 11/1998 | |
| JP | 11-045071 | 2/1999 | |
| JP | 11-183870 | 7/1999 | |
| JP | 11-231834 | 8/1999 | |
| JP | 11-282419 | 10/1999 | |
| JP | 11-311970 | 11/1999 | |
| JP | 2000-081920 | 3/2000 | |
| JP | 2000-122607 | 4/2000 | |
| JP | 2000-194428 | 7/2000 | |
| JP | 2000-267164 | 9/2000 | |
| JP | 2001-005426 | 1/2001 | |
| JP | 2001-034221 | 2/2001 | |
| JP | 2001-042822 | 2/2001 | |
| JP | 2001-042822 A | 2/2001 | |
| JP | 2001-042827 | 2/2001 | |
| JP | 2001-042847 | 2/2001 | |
| JP | 2001-056664 | 2/2001 | |
| JP | 2001-056667 | 2/2001 | |
| JP | 2001-147659 | 5/2001 | |
| JP | 2001-195042 | 7/2001 | |
| JP | 2001-242839 | 9/2001 | |
| JP | 2001-290469 | 10/2001 | |
| JP | 2002-062845 | 2/2002 | |
| JP | 2002-514320 | 5/2002 | |
| JP | 2002-517806 | 6/2002 | |
| JP | 3287391 | 6/2002 | |
| JP | 2002-215095 | 7/2002 | |
| JP | 2002207465 A * | 7/2002 | G09G 3/36 |
| JP | 2002-221936 | 8/2002 | |
| JP | 2002-251166 | 9/2002 | |
| JP | 2002-278497 | 9/2002 | |
| JP | 2002-351404 | 12/2002 | |
| JP | 2003-066902 | 3/2003 | |
| JP | 2003-066903 | 3/2003 | |
| JP | 2003-066909 | 3/2003 | |
| JP | 2003-066909 A | 3/2003 | |
| JP | 2003-150112 | 5/2003 | |
| JP | 2003-195812 | 7/2003 | |
| JP | 2004-004789 | 1/2004 | |
| KR | 0137475 B | 6/1998 | |
| KR | 2003-0004774 A | 1/2003 | |
| KR | 2004-0039934 A | 5/2004 | |
| WO | WO98-48403 | 10/1998 | |
| WO | WO99-65011 | 12/1999 | |
| WO | WO01/11598 | 2/2001 | |

(56) References Cited

FOREIGN PATENT DOCUMENTS

| WO | WO02-39420 | 5/2002 |
|---|---|---|
| WO | WO03-034381 | 4/2003 |
| WO | 03/038797 A1 | 5/2003 |
| WO | WO 03/038793 A1 | 5/2003 |
| WO | 2004/003877 A2 | 1/2004 |

OTHER PUBLICATIONS

International Search Report (Application No. PCT/JP03/16354) dated Mar. 9, 2004.
International Preliminary Examination Report (Application No. PCT/JP03/16354) dated Apr. 20, 2004 with partial translation.
Ytunoto et al., "Pixel-Driving Methods for Large-Sized Poly-Si AM-OLED Displays," *Asia Display / IDW '01*, Jan. 1, 2001, pp. 1395-1398.
Hattori et al., "Analog-Circuit Simulation of the Current-Programmed Active-Matrix Pixel Electrode Circuits Based on Poly-Si TFT for Organic Light-Emitting Displays," *Digest of Technical Papers, AM-LCD '01*, Jul. 11, 2001, pp. 223-226.
Abe et al., "A Poly-Si TFT 6-bit Current Data Driver for Active Matrix Organic Light Emitting Diode Displays," *EuroDisplay '02*, Jan. 1, 2002, pp. 279-282.
R. Hattori, "Data-Line Driver Circuits for Current-Programmed Active-Matrix OLED Based on Poly-Si TFT's," *Digest of Technical Papers AM-LCD '02*, Jan. 1, 2002, pp. 17-20.
Groeneveld D. et al., "A Self-Calibration Technique for Monolithic High-Resolution D/A Converters", IEEE Journal of Solid-State Circuits, 1989, vol. 24, No. 6, pp. 1517-1522.
Tan S. et al., "32.4: Designing of Circuit Building Blocks for OLED-on-Silicon Microdisplays", SID Digest 02: SID International Symposium Digest of Technical Papers, 2002, pp. 980-983.
Supplementary European Search Report (Application No. EP 03780930.8, PCT/JP0316354 dated Feb. 20, 2007), 5 pages.
Chinese Office Action (Application No. 200380108899.9), dated Sep. 28, 2007 with full English translation, 11 pages.
Official Communication, European Application No. 03780930.8; mailed Aug. 11, 2010, 8 pages.
Office Action, Korean Application No. 2005-7012957, dated Oct. 19, 2010, 20 pages with English translation.
Office Action, Korean Application No. 2010-7028420, dated Jan. 11, 2011, 9 pages with English translation.

* cited by examiner

FIG. 1
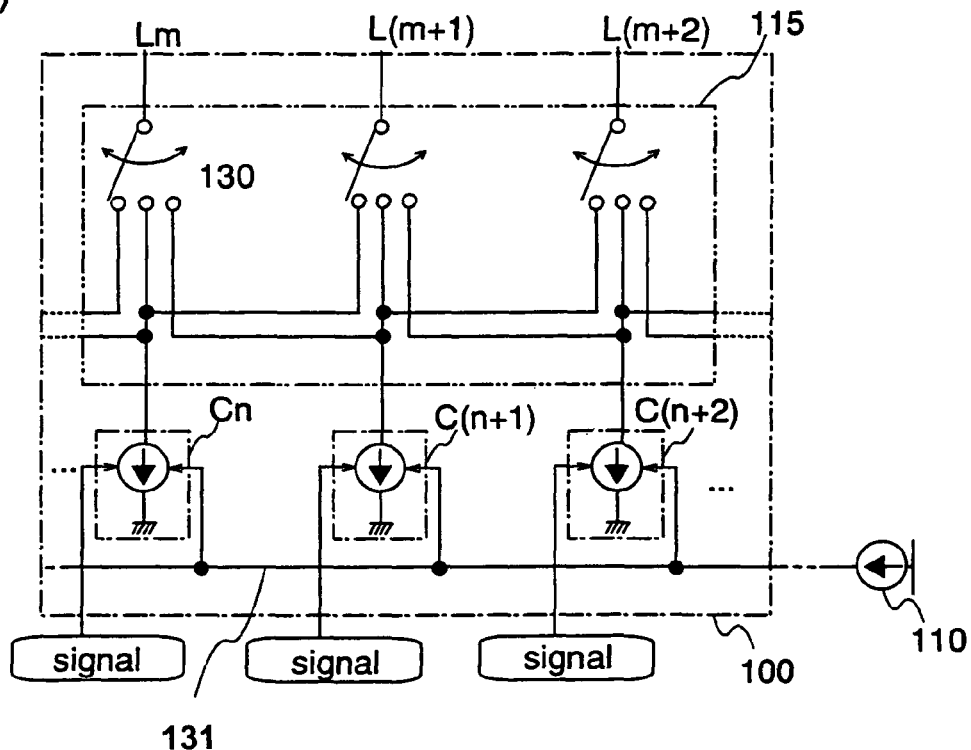
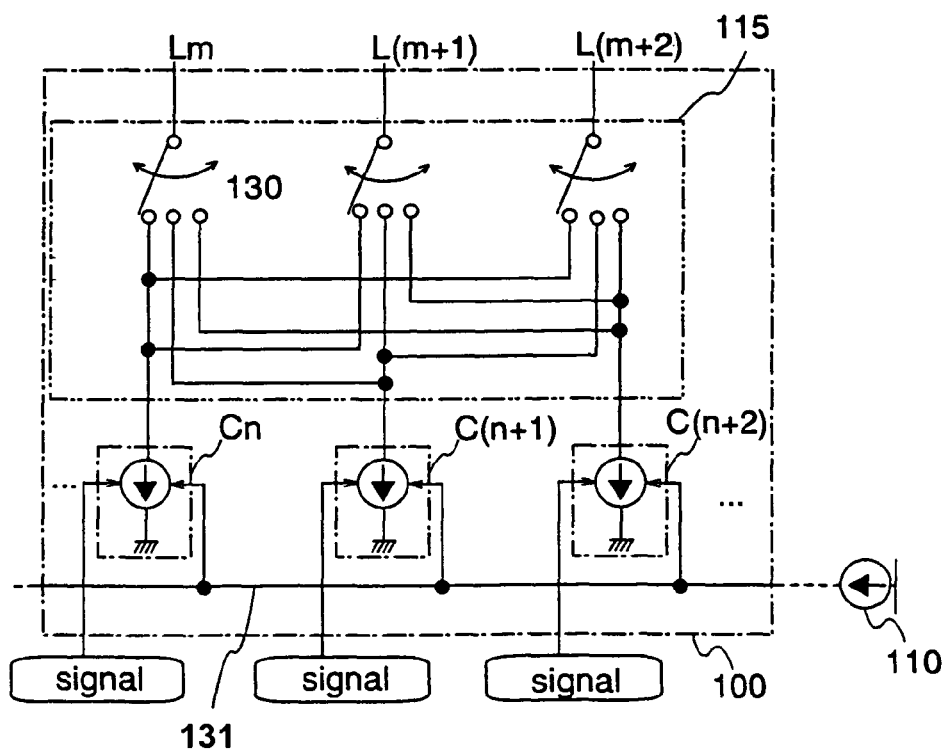

FIG. 4
(A)
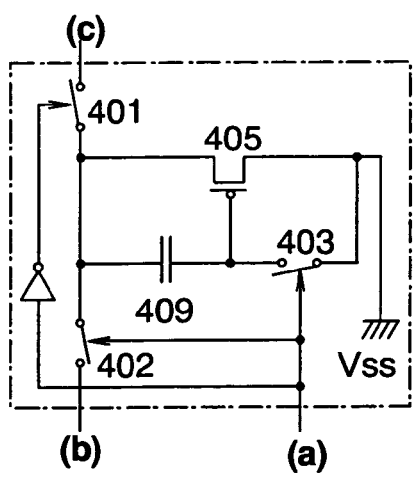
(B)
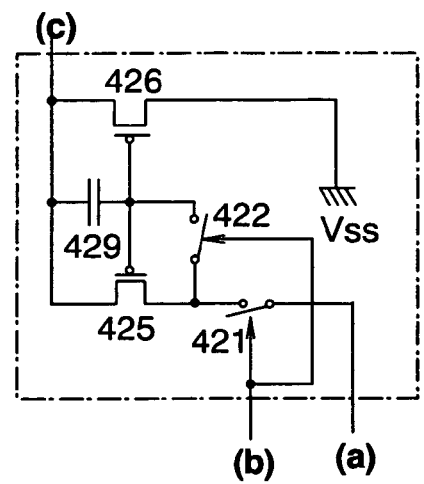
(C)
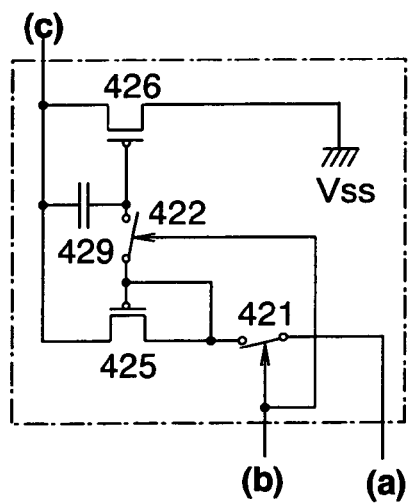
(D)
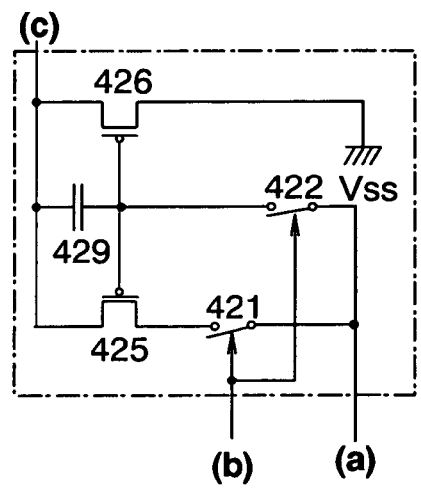

FIG. 5
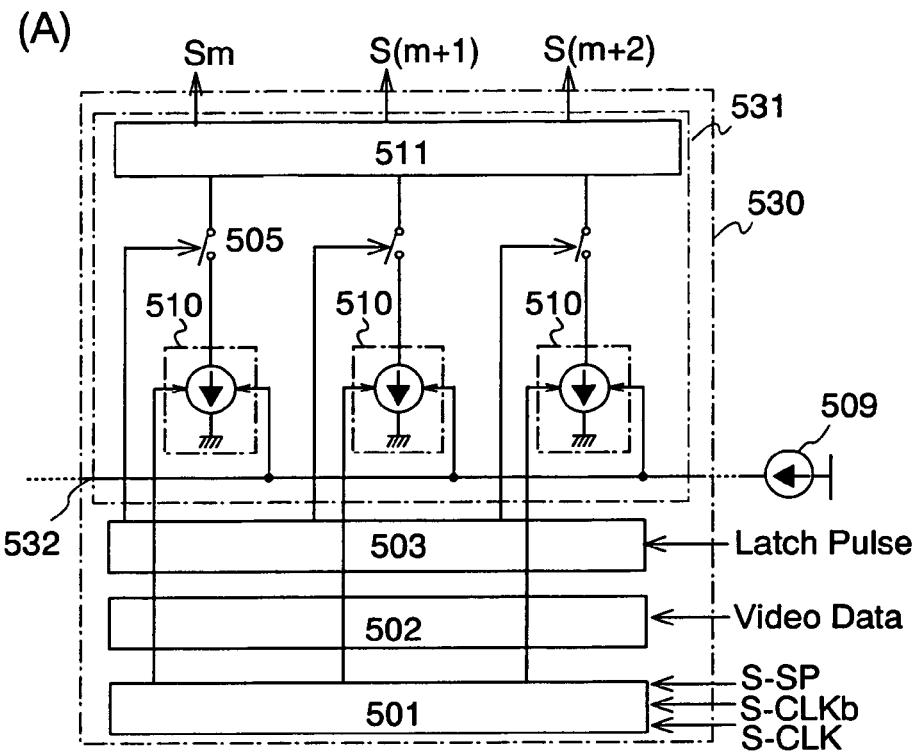
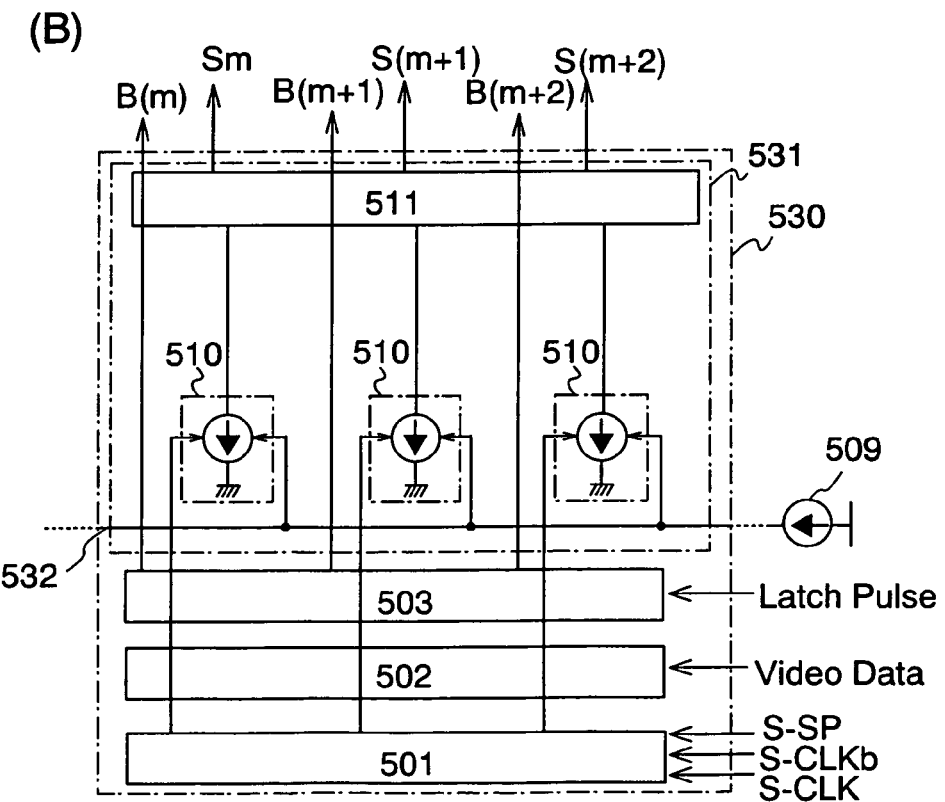

FIG. 7
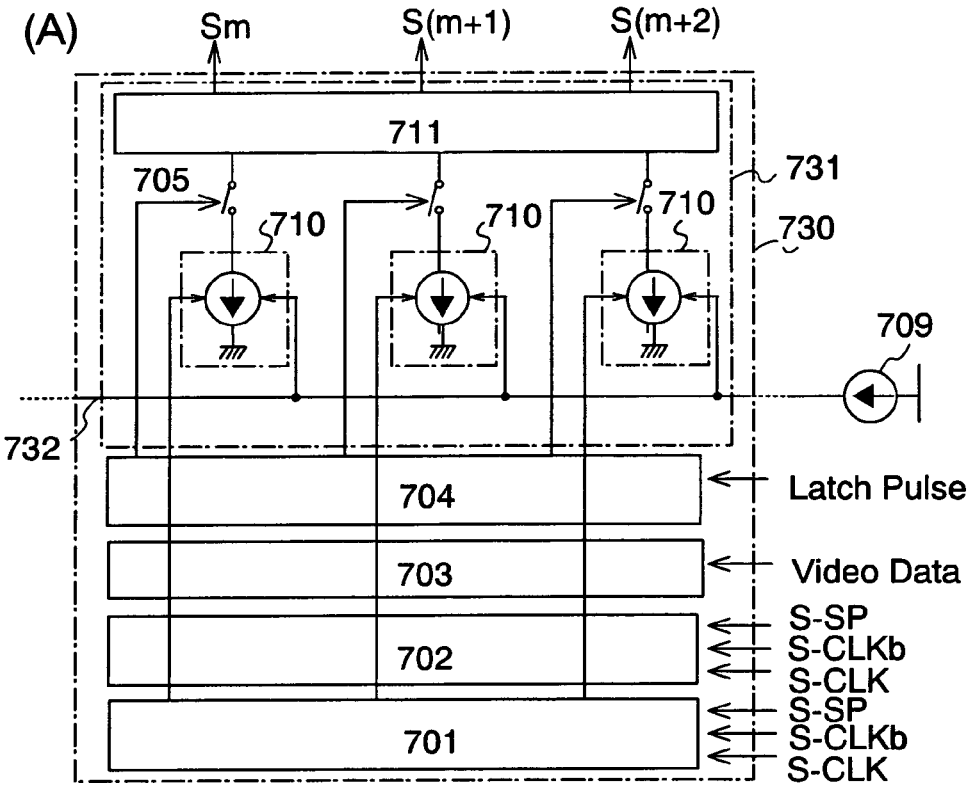
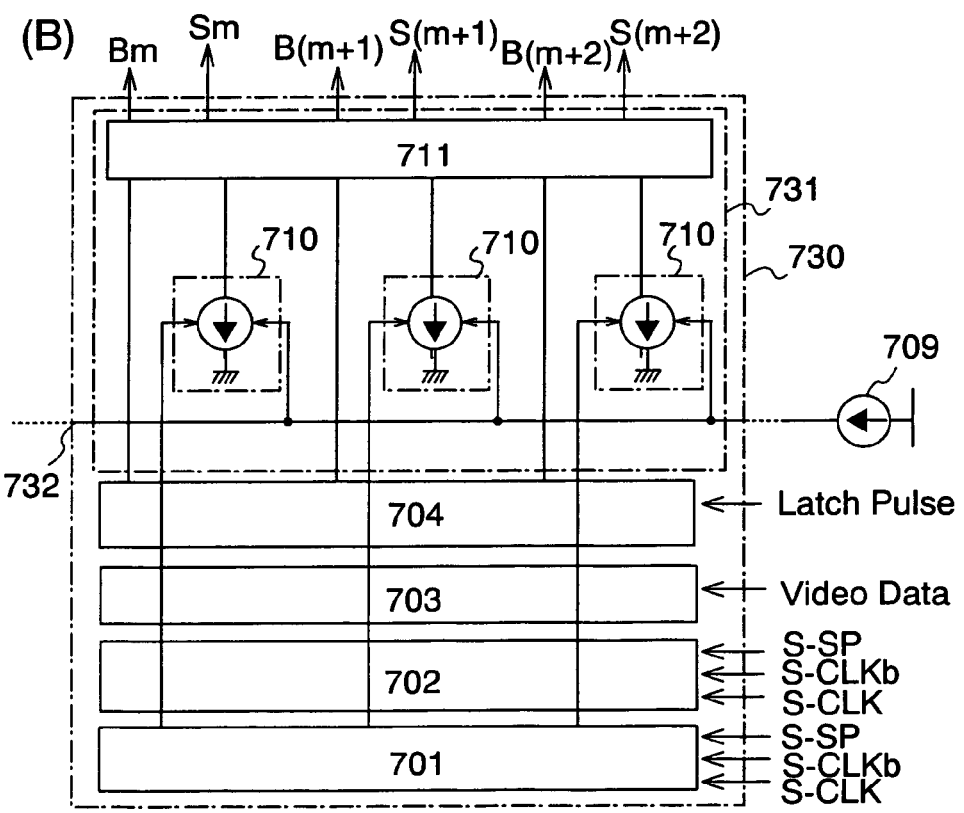

CURRENT SOURCE CIRCUIT, A SIGNAL LINE DRIVER CIRCUIT AND A DRIVING METHOD THEREOF AND A LIGHT EMITTING DEVICE

TECHNICAL FIELD

The present invention relates to a current source to supply a constant current and a current source circuit having a current source. Further, the invention relates to a signal line driver circuit provided with a current source and a light emitting device provided with a signal line driver circuit. The invention also relates to a driving method of a current source circuit and a signal line driver circuit.

BACKGROUND ART

In recent years, a light emitting device using a self-luminous element has been advanced in research and development and drawing a great deal of attention as a next generation display. This self-luminous element has an element structure that a layer containing an organic compound is sandwiched between an anode and a cathode.

One of driving methods in the case of displaying a multi gray scale image with a light emitting device using a self-luminous element is a current input method. In this current input method, current value data is written to a self-luminous element as a signal to control luminance. The luminance is in proportion to a current supplied to the self-luminous element (hereinafter simply referred to as a signal current), therefore, the signal current is required to be accurately supplied to the self-luminous element. However, as the characteristics of active elements (specifically transistors) configuring a power supply for supplying a signal current vary, it is difficult to input an accurate signal current to the self-luminous element.

To solve a problem that the luminance non-uniformity due to variations in characteristics of thin film transistors (TFTs) and OLEDs in a driving method of current input, a configuration has been suggested in which a current specification type AM drive pixel circuit using a polysilicon transistor and a DAC circuit having a reset function are provided to OLED as a driving method by the current input method. It is also disclosed that a channel length is designed long, and the like.
[Non-Patent Document 1]
Reiji Hattori and three others, "Technical Report of Institute of Electronics, Information and Communication Engineers", ED 2001-8, pp. 7-14, "Circuit Simulation of Current Specification Type Polysilicon TFT Active Matrix-Driven Organic LED Display"

DISCLOSURE OF THE INVENTION

Problems to be Solved by the Invention

Nevertheless, the configuration designed for suppressing the variation of a current source disclosed in the aforementioned document is required to satisfy various conditions. Further, transistors vary in their element characteristics due to the non-uniformity in thickness of a semiconductor film and gate insulating film laminated in the manufacturing process and patterning precision and the like. Moreover, in the case of a polysilicon transistor, crystallinity varies due to a defect in crystal growth direction and crystal grain boundary. Therefore, it is not sufficient just to lengthen channel length.

In consideration of the variations in characteristics of the transistors, particularly poly-silicon transistors, the invention provides a current source circuit having a current source which is not dependent on the variation in characteristics thereof. The invention also provides a signal line driver circuit having a current source circuit and the driving method thereof, and a light emitting device provided with a signal line driver circuit.

Means for Solving the Problem

In order to achieve the aforementioned goal, according to the invention, it characterized in that a signal current value (output current value) to be supplied from a current source circuit having a plurality of current sources disposed on each wiring (output line, specifically a signal line and the like) is set so that a predetermined signal current can be supplied by using a reference constant current source (inputted from outside), and further an electrical connection between a wiring through which a signal current is outputted (hereinafter simply referred to as an output line) and a power supply line is changed over in each certain period (fixed period).

Specifically, it characterized in that the current source circuit of the invention comprises a means for setting a signal current value supplied from a current source and a means for changing over an electrical connection between an output line and a power supply in each certain period.

According to the invention, the variations are decreased due to the setting (also referred to as programming) of a signal current. Thus, it characterized that the variations can be averaged to eliminate the effect of the variations of signal current by changing over, even if some variations occur.

Furthermore, the electrical connection between the output line and the current source does not refer to a physical connection, but refers to a conductive state between the output line and the power supply. That is, when a transistor disposed between the output line and the power supply is conductive, the output line and the current source are referred to as being electrically connected. Therefore, the output line and a plurality of power supplies are connected through a transistor, and the power supply is electrically connected to the output line only when the transistor is conductive.

Effect of the Invention

A signal line driver circuit which is not dependent on the variations in characteristics of the transistors, in particular polysilicon transistors can be provided by using a changing over circuit and a current source circuit of the invention having a function to supply a set current to a pixel. Further, the invention provides a driving method of the signal line driver circuit which is not dependent on the variations in characteristics of the transistors of the current source circuit, and a light emitting device provided with a signal line driver circuit.

BRIEF DESCRIPTION OF DRAWINGS

FIG. 1 is diagram showing configurations of the current source circuit of the invention.
FIG. 4 is diagram showing configurations of the current source of the invention.
FIG. 5 is diagram showing configurations of the signal line driver circuit of the invention.

FIG. 7 is diagram showing configurations of the signal line driver circuit of the invention.

BEST MODE FOR CARRYING OUT THE INVENTION

Embodiment modes of the invention are hereinafter described with reference to the drawings.

[Embodiment Mode 1]

Figure 2:
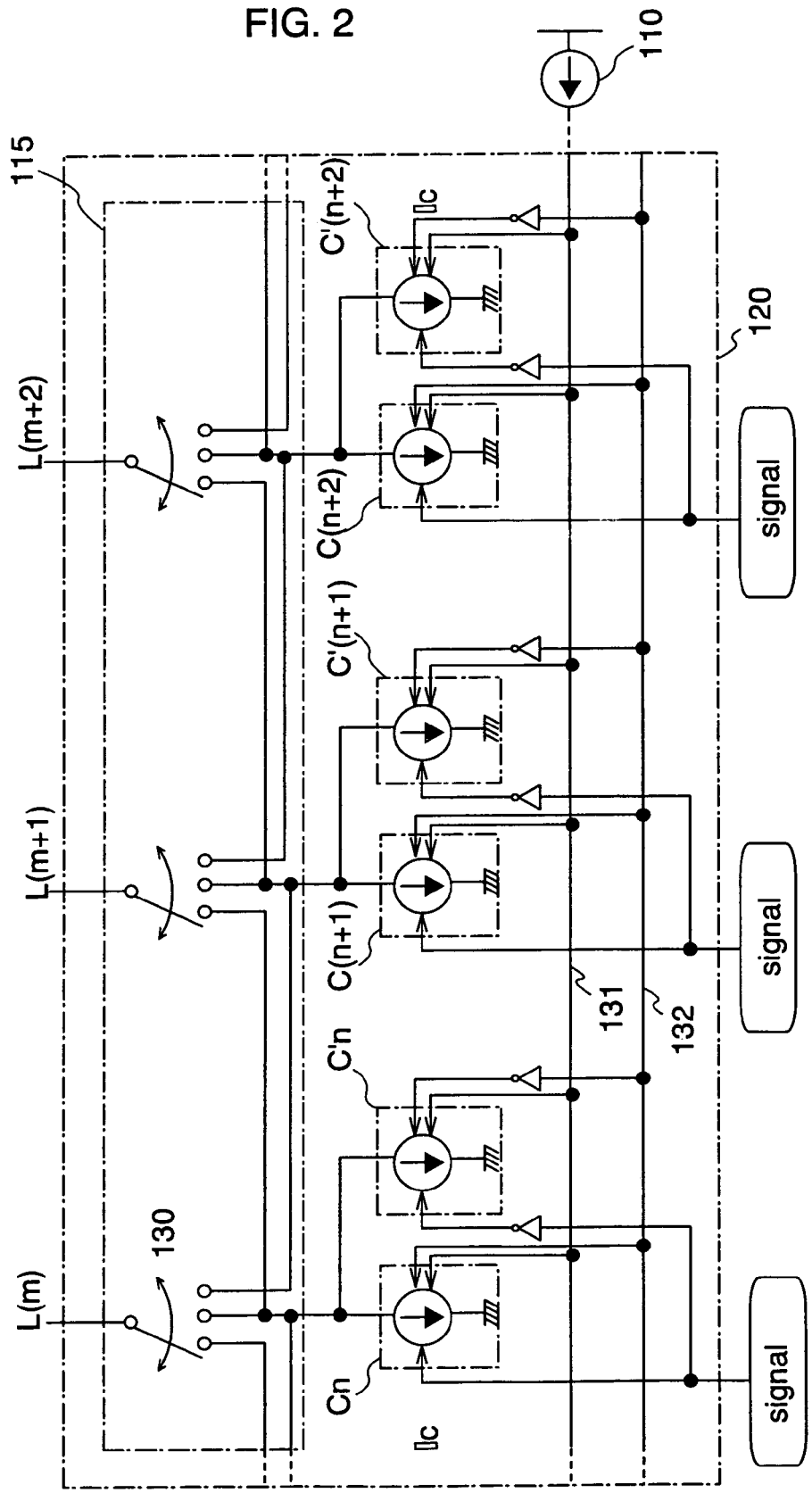
FIG. 2 is a diagram showing a configuration of the current source circuit of the invention.

A means for setting a signal current value supplied from the current source of the invention and the current source circuit, and a means for changing over an electrical connection between an output line and a current source in each certain period (hereinafter simply referred to as a changing over circuit) are described with reference to FIGS. 1 and 2. Note that FIGS. 1 and 2 show a current source circuit in the periphery of an output line $L_m$, $L_{(m+1)}$, and $L_{(m+2)}$ of from m-th row to (m+2)th row. Also, FIGS. 1 and 2 show a changing over circuit schematically by a plurality of terminals and a switch (sw) 130 for specifying the terminal.

In FIG. 1(A), a power supply circuit 100 comprises power supplies $C_n$, $C_{(n+1)}$, and $C_{(n+2)}$ and a changing over circuit 115, and the power supplies $C_n$, $C_{(n+1)}$, and $C_{(n+2)}$ are connected to output lines $L_m$, $L_{(m+1)}$, and $L_{(m+2)}$ through the changing over circuit 115. The power supplies $C_n$, $C_{(n+1)}$, and $C_{(n+2)}$ are connected to a reference constant current source 110 through a current line 131. Note that the reference constant current source 110 may be integrally formed on a substrate with a circuit, or inputted a constant current by using an IC and the like from outside of the substrate.

According to means for setting a signal current value outputted from the current source, specifically, configuration that setting signal (signal) is inputted to the power supplies $C_n$, $C_{(n+1)}$, and $C_{(n+2)}$, subsequently, on the basis of this setting signal, the current is supplied to the power supplies $C_n$, $C_{(n+1)}$, and $C_{(n+2)}$ from the reference current source 110. By this configuration, set signal current (hereinafter simply referred to as set current) can be supplied from the current sources. Furthermore, an electrical connection between the output lines $L_m$, $L_{(m+1)}$, and $L_{(m+2)}$ and the power supplies $C_n$, $C_{(n+1)}$, and $C_{(n+2)}$ is changed over by the changing over circuit 115 in each certain period.

FIG. 1(B) shows the case where the connection of the changing over circuit is different than the one in FIG. 1(A). The changing over circuit in FIG. 1(B) changes three current sources and three output lines together as one set. Other configurations are similar to the one in FIG. 1(A), therefore, the description is omitted here.

In the case where the current sources and the output line are changed over together as one set as shown in FIG. 1(B), connecting wirings can be simply designed. Moreover, when performing a display, particularly, variations of the signals outputted from adjacent output lines in particular are easily recognized. Therefore, the effect of the invention can be achieved even with a connecting configuration to change over the current source and the output line together as one set.

In this manner, the changing over circuit of the invention is not limited in its connection configuration as long as it has a function to change over the current sources and the output line.

Further, the changing over means can be applied to a reference circuit as well. That is to say, variations of a signal current, that is of a set current can be decreased by changing over the current source as a reference.

According to the invention shown in FIG. 1, variations of signal current which are visible to human eyes can be almost completely removed by using a means for setting a signal current value outputted from such current sources and by using a changing over circuit. Therefore, according to the current source circuit of the invention, a display unevenness of a light emitting device can be almost completely removed.

A current source circuit of the invention having a different configuration than the one in FIG. 1 is described with reference to FIG. 2.

FIG. 2 is different than FIG. 1 in the respect that a plurality of current sources are provided for each output line in a current source circuit 120, and those current sources are connected to a control line 132. Here, it is assumed hypothetically that two current sources (first current sources $C_n$, $C_{(n+1)}$, $C_{(n+2)}$, and second current sources $C'_n$, $C'_{(n+1)}$, and $C'_{(n+2)}$) are provided. Other configurations are similar to the one in FIG. 1(A), therefore the description is omitted here.

By providing a first current source and a second current source to each output line, the current source can alternately perform both of a set operation for setting a signal current on the basis of a set signal and an output operation for supplying a set current from the current source to the output line through the changing over, circuit. Therefore, the set operation and an input operation can be performed at the same time per output line. By performing the set operation and the output operation with each current source in this manner, the set operation can be spent a lot of time performing. It should be noted that signals from a control line control whether the first current source and the second current source performs the set operation or the output operation.

It is needless to say that a connection of the changing over circuit shown in FIG. 1(B) can be applied to the changing over circuit shown in FIG. 2. Also, the changing over circuit of the invention can be applied to the reference circuit as well. That is, a plurality of current sources provided in the reference circuit may be changed over by the changing over circuit so that uniform signals can be supplied.

According to the invention shown in FIG. 2, the set operation for setting a signal current value outputted from the current source can be spent a lot of time performing. Further, variations of signal current which are visible to human eyes can be almost completely removed by a current source circuit having the changing over circuit. Therefore, a display unevenness of a light emitting device can be almost completely removed by the current source circuit of the invention.

The set operation of the invention can be performed for an arbitrary period of time, at an arbitrary timing, and arbitrary number of times. The timing of the set operation can be arbitrarily controlled by a pixel configuration (current source circuit disposed in a pixel) or a configuration of the current source circuit and the like disposed in a signal line driver circuit. As for the number of times to perform the set operation, it may be performed at least once when starting the operation by supplying current to the signal line driver circuit. However, data obtained as a signal current may in fact leak by the set operation, therefore, the set operation is desirably performed a plurality of times.

The set operation can be performed for an arbitrary period of time by specifying a current source disposed in an arbitrary column among from the first to the last columns by using a video signal. Then, a current source which requires the set operation can be specified among the current sources disposed in a plurality of columns and the set operation can be spent a lot of time performing to the specified current source. As a result, an accurate set operation can be performed.

A set operation can be performed sequentially from the current source of the first column to the one of the last column. At this time, the set operation is desirably performed randomly, not from the first column in order. Accordingly, the time to perform the set operation to the current source becomes free and can be performed for a long time. For example, in the case of performing the set operation in one frame period, the set operation of one column of current source can be performed by consuming one frame. Further, an effect of the leakage of charge in a capacitor disposed in the current source can be less noticeable.

Described with reference to FIGS. 1 and 2 are the case of supplying a signal current which is in proportion to a video signal to an output line, however, a set current may be supplied to a different wiring than the output line.

Figure 11:
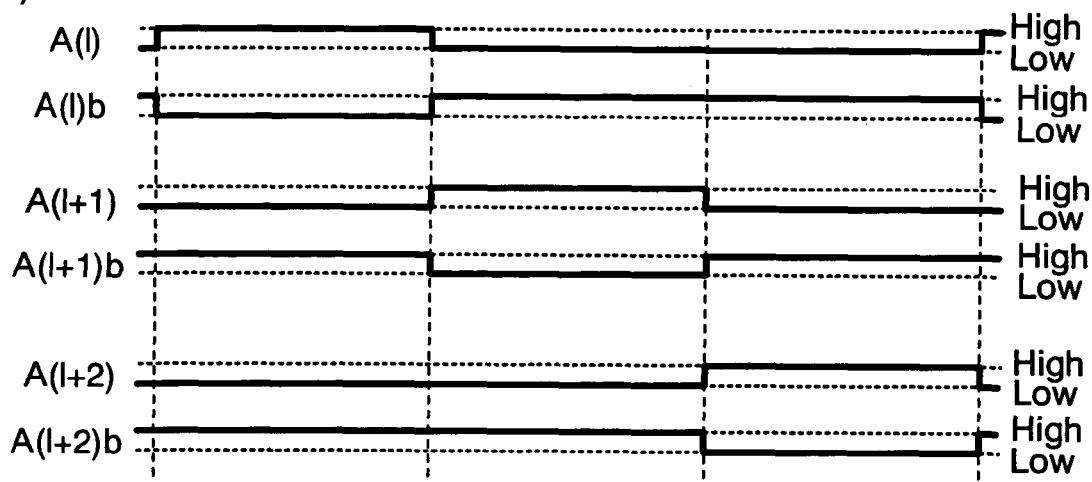
FIG. 11 is a diagram showing a configuration of the signal line driver circuit of the invention.

Next, a changing over circuit is described. The changing over circuit is not limited in its connecting configuration as long as it has a function to change over as shown in a timing chart of FIG. 11. As shown in FIG. 11(A), an inverted signal is inputted to each of signal input lines A(l), A(l)b, A(l+1) and A(l+1)b, and A(l+2) and A(l+2)b of the changing over circuit and they are sequentially selected. At this time each analog switch and the like connected to the selected signal input line are turned ON and a current source and an output line connected to the analog switch which is turned ON are electrically connected.

FIG. 11(B) shows a state of changing over a connection between each of the output lines $L_m$, $L_{(m+1)}$, and $L_{(m+2)}$ and each of the current sources $C_{(n-1)}$, $C_n$, $C_{(n+1)}$, $C_{(n+2)}$, and $C_{(n+3)}$ according to the selected signal input line.

First, when the signal input lines A(l) and A(l)b are selected, the output line $L_m$ is electrically connected to the current source $C_{(n-1)}$, the output line $L_{(m+1)}$ is electrically connected to the current source $C_n$, and the output line $L_{(m+2)}$ is electrically connected to $C_{(n+1)}$.

Next, when the signal input lines A(l+1) and A(l+1)b are selected, the output line $L_m$ is electrically connected to the current source $C_n$, the output line $L_{(m+1)}$ is electrically connected to the current source $C_{(n+1)}$, and the output line $L_{(m+2)}$ is electrically connected to $C_{(n+3)}$.

Subsequently, when the signal input line A(l+2) and A(l+2)b are selected, the signal input line $L_m$ is electrically connected to the current source $C_{(n+1)}$, the signal input line $L_{(m+1)}$ is electrically connected to the current source $C_{(n+2)}$, and the signal input line $L_{(m+2)}$ is electrically connected to $C_{(n+3)}$.

A connection of the output line and the current source is changed over by the changing over circuit of the invention, therefore, an effect of variations in characteristics of the transistors configuring the current source, polysilicon transistors in particular can be decreased. That is, the output line for supplying a signal current is changed over sequentially even when signal current value varies, therefore, the variations are averaged in terms of time and become visibly uniform to human eyes.

Note that the configuration of the power source circuit of the invention can be applied to a signal line driver circuit and other circuits. Further, it can be applied not only to a line sequential drive, but to a dot sequential drive as well.

The invention can be used when performing a digital gray scale display of one bit or a plurality of bits.

It should be noted that it is one of the features of the invention to decrease the variations of signal current. Other than a thin film transistor, a transistor using a single crystal, a transistor using SOI, or an organic transistor can be applied as a transistor to be decreased the variations in characteristics.

[Embodiment Mode 2]

In this embodiment mode, a circuit configuration of the power supply described in FIGS. 1 and 2 is described.

Figure 3:
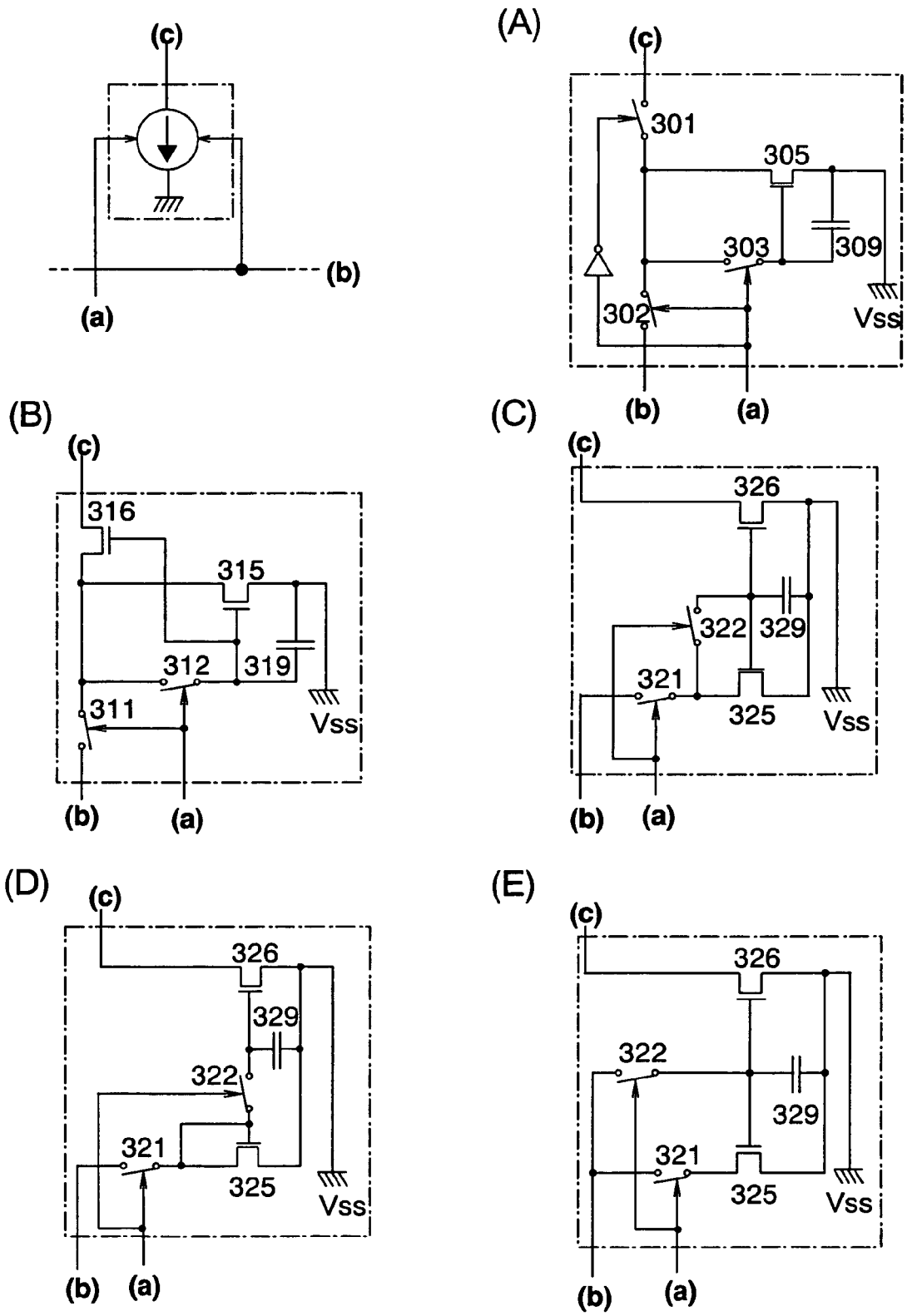
FIG. 3 is diagram showing configurations of the current source of the invention.

FIG. 3 shows one current source in which (a) is connected to a set signal, (b) is connected to a reference constant current source (constant current source) 110, and (c) is connected to a changing over circuit. Specific examples of an equivalent circuit of the current source are shown in FIGS. 3(A) to 3(E).

In FIG. 3(A), a circuit including switches: sw301, sw302, and sw303 and a transistor 305 (n-channel type) and a capacitor 309 which holds a gate-source voltage VGS of the transistor 305 corresponds to a current source. It should be noted that the capacitor 309 may be substituted by a gate capacitance of a transistor and the like. That is to say, in the case where a gate capacitance of a transistor is large and the amount of leak current from each transistor is acceptable, a capacitor is not required to be provided.

In the current source shown in FIG. 3(A), a set signal is inputted from (a) and sw302 and sw303 are turned ON. Then, current is supplied from the constant current source 110 through (b). A charge is held in the capacitor 309 until the supplied current becomes equal to a drain current of the transistor 305. Further, when the transistor 305 is set to operate in a saturation region, a constant current can be supplied to a light emitting element even when a source-drain voltage changes.

Subsequently, when a signal to turn OFF sw302 and sw303 is inputted from (a), an inverted signal by an inverter is inputted and sw301 is turned ON. Then, as the signal current is held in the capacitor 309, the transistor 305 has a function to flow a signal current. Then, a certain output line is selected by the changing over circuit, and a signal current is supplied to the selected output line from the current source through (c).

At this time, a gate voltage of the transistor 305 is maintained at a predetermined gate voltage by the capacitor 309, therefore, a drain current corresponding to the signal current flows in a drain region of the transistor 305. In this manner, a signal current (set current) is set and an output line to which a set current is supplied is changed over in each certain period by using the changing over circuit.

It should be noted that a connection of sw302 and sw303 is not limited to the configuration shown in FIG. 3(A) as long as it is controlled by a set signal.

In FIG. 3(B), a circuit comprising switches: sw311 and sw312, a transistor 315 (n-channel type), a capacitor 319 which holds a gate-source voltage VGS of the transistor 315, and a circuit having a transistor 316 (n-channel type) corresponds to a current source. The capacitor 319 may be substituted by a gate capacitance of a transistor and the like. That is to say, in the case where a gate capacitance of a transistor is large and the amount of leak current from each transistor is acceptable, a capacitor is not required to be provided.

In the current source shown in FIG. 3(B), a set signal is inputted from (a) and sw311 and sw312 are turned ON. Then, current is supplied from a constant current source 110 through (b). A charge is held in the capacitor 319 until the supplied current becomes equal to a drain current of the transistor 315. When sw312 is turned ON, a gate-source voltage VGS of the transistor 316 becomes 0 V, therefore, the transistor 316 is turned OFF.

Subsequently, when a signal to turn OFF sw311 and sw312 is inputted from (a), a gate-source voltage VGS of the transistor 316 is generated and the transistor 316 is turned ON. Then, a signal current is held in the capacitor 319, therefore, the transistor 315 has a function to flow the signal current. Then, a certain output line is selected by the changing over circuit, and a signal current is supplied to the selected output line from the current source through (c).

At this time, a gate voltage of the transistor 315 is maintained at a predetermined gate voltage by the capacitor 319, therefore, a drain current corresponding to the signal current flows in a drain region of the transistor 315. Further, by setting the transistor 315 to operate in a saturation region, a constant current can be supplied to a light emitting element even when a source-drain voltage changes. In this manner, a signal current (set current) is set and an output line to which a set current is supplied is changed over in each certain period by using the changing over circuit.

In FIG. 3(C), a circuit comprising switches: sw321 and sw322, transistors 325 and 326 (n-channel type), a capacitor 329 which holds a gate-source voltage VGS of the transistors 325 and 326 corresponds to a current source. The capacitor 329 may be substituted by a gate capacitance of a transistor and the like. That is to say, in the case where a gate capacitance of a transistor is large and the amount of leak current from each transistor is acceptable, a capacitor is not required to be provided.

In the current source shown in FIG. 3(C), a set signal is inputted from (a) and sw321 and sw322 are turned ON. Then, current is supplied from a constant current source 110 through (b). A charge is held in the capacitor 329 until the supplied current becomes equal to a drain current of the transistor 325. At this time, gate electrodes of the transistors 325 and 326 are connected, therefore, gate voltages of the transistors 325 and 326 are held by the capacitor 329.

Subsequently, a signal to turn OFF sw321 and sw322 is inputted from (a). Then, a signal current is held in the capacitor 329, therefore, the transistor 326 has a function to flow the signal current. Then, a certain output line is selected by the changing over circuit, and a signal current is supplied to the selected output line from the current source through (c).

At this time, a gate voltage of the transistor 326 is maintained at a predetermined gate voltage by the capacitor 329, therefore, a drain current corresponding to the signal current flows in a drain region of the transistor 326. Further, by setting the transistors 325 and 326 to operate in a saturation region, a constant current can be supplied to a light emitting element even when a source-drain voltage changes. In this manner, a signal current (set current) is set and an output line to which a set current is supplied is changed over in each certain period by using the changing over circuit.

At this time, in order to flow a drain current corresponding to the signal current to the drain region of the transistor 326 accurately, it is required that the characteristics of the transistors 325 and 326 are the same. In particular, values of mobility, threshold and the like of the transistors 325 and 326 are required to be the same. In FIG. 3(C), a set current which is in proportion to the current supplied from the constant current source 110 may flow to a pixel by arbitrarily setting values of W(gate width)/L(gate length) of the transistors 325 and 326.

Current sources shown in FIGS. 3(D) and 3(E) are different than the current source shown in FIG. 3(C) in their connecting configurations of sw322, however, the connecting configurations of the other circuit elements are the same. The operations of the current sources shown in FIGS. 3(D) and 3(E) are the same as the one of the current source shown in FIG. 3(C), therefore, the description is omitted in this embodiment mode.

In the current source shown in FIG. 3, current flows in the direction from a pixel to the current source. However, current may flow in the direction from the current source to the pixel as well. Note that whether current flows in the direction from a pixel to the current source or in the direction from the current source to the pixel depends on a pixel configuration. In the case where current flows in the direction from the current source to the pixel, Vss may be changed to Vdd and the transistors 305, 315, 316, 325 and 326 may be changed to p-channel type in the circuit diagram shown in FIG. 3.

The direction of current flow (direction from the pixel to the current source) is similar in FIGS. 3(A) and 3(C) to 3(E), and the polarity of the transistors can be changed to p-channel type as well. FIGS. 4(A) and 4(B) to 4(D) show circuit configurations of current sources in which the directions of current flow are the same and the transistors 305, 325 and 326 shown in FIGS. 3(A) and 3(C) to 3(E) are changed to p-channel type. The circuit configurations shown in FIG. 4 are different than the ones in FIG. 3 mainly in the respect of connections of switches and capacitors.

In this manner, the polarity of the transistors configuring the current source of the invention may be either n-channel type or p-channel type. Further, in the case of flowing current in the direction from the current sources to the pixels in the circuit diagrams shown in FIG. 4, Vss may be changed to Vdd and transistors 405, 425 and 426 may be changed to n-channel type.

By using the current source circuit in which a set signal is inputted to the current source and a set current is supplied from the current source according to the set signal, and an electrical connection between the current source and the output line is changed over by the changing over circuit, variations in characteristics of the transistors configuring the current source, in particular polysilicon transistors can be suppressed. Therefore, according to the current source circuit of the invention, display unevenness of the light emitting device can be almost completely removed.

[Embodiment Mode 3]

In this embodiment mode, a specific example of the configuration of a signal line driver circuit having a current source circuit is described.

FIG. 5(A) is a schematic diagram of a signal line driver circuit in the periphery of signal lines of from m-th column to (m+2)th column. A signal line driver circuit 503 comprises a plurality of current sources 510, a changing over circuit 511, a current source circuit 531 having a plurality of switches 505, a shift register 501, a first latch circuit 502, and a second latch circuit 503. A set signal is inputted from the changing over circuit 511 to a pixel through current output lines $S_m$, $S_{(m+1)}$, and $S_{(m+2)}$.

First, operations of the shift register 501, the first latch circuit 502 and the second latch circuit 503 are described. The shift register 501 is configured by using a plurality of columns of flip-flop circuit (FF) and the like, and inputted with a clock signal (S-CLK), a start pulse (S-SP), and a clock inverted signal (S-CLKb). In accordance with the timing of these signals, sampling pulses are sequentially outputted.

The sampling pulse outputted from the shift register 501 is inputted to the first latch circuit 502. The first latch circuit 502 is inputted with digital video signals. The first latch circuit 502 holds a video signal in each column in accordance with the timing at which sampling pulses are inputted.

After video signals are held to the last column in the first latch circuit 502, a latch pulse is inputted to the second latch circuit 503 in a horizontal retrace period, and the video signals held in the first latch circuit 502 are transferred to the second latch circuit 503 all at once. Then, one row of the video signals held in the second latch circuit 503 are inputted to the plurality of switches 505 of the current source circuit at the same time.

While the video signals held in the second latch circuit 502 are inputted to the plurality of switches 505 of the current source circuit, sampling pulses are outputted from the shift register 501 again. This operation is repeated to process one frame of video signals. Note that the current source circuit may convert digital signals into analog signals.

The set signal to be inputted to the plurality of current sources 510 is described. The plurality of current sources 510 are supplied with a predetermined signal current from a reference constant current source 509 through a current line 532 according to the set signal, and the current sources 510 are set in accordance with the timing of the set signals. Note that the set signals in this embodiment mode correspond to sampling pulses supplied from the shift register 510 or signals supplied from an output terminal of a logic operator connected to a set control line (not shown in FIG. 5(A)). Note that one of the two input terminals of the logic operator is inputted with a sampling pulse of the shift register and the other is inputted with a signal from the set control line. In the logic operator, a signal is outputted by performing logical operations on two inputted signals. The logic operator can change over the case of using the video signals for controlling the pixel (displaying an image) and the case of using the video signals for controlling the current source.

The sampling pulse or the signal supplied from the output terminal of the logic operator connected to the set control line is supplied to the plurality of current sources 510 depending on the configuration of the current source. More specifically, in the case where the plurality of current sources 510 are configured by FIG. 3(A) or 3(B), the signal supplied from the output terminal of the logic operator connected to the set control line corresponds to a set signal. Further, in the case where the plurality of current sources 510 are configured by FIG. 3(C), 3(D), or 3(E), the sampling pulse from the shift register corresponds to a set signal.

When a High video signal is inputted to a switch 505, a set current is supplied from the current source 510 to a signal line. On the other hand, when a Low video signal is inputted to the switch 505, a set current is not supplied to the signal line. That is to say, the current source 510 has a function (VGS) to supply a set current, and whether or not to supply a set current to the pixel is controlled by the switch 505.

After that, an electrical connection between the current source and the signal line is changed over in each certain period by the changing over circuit 511.

The current source in this embodiment mode can arbitrarily employ any of the configurations of the current sources shown in FIGS. 3 and 4. Also, the current source circuit may employ different configurations in combination as well as employing a single configuration.

Described with reference to FIG. 5(A) is the case of supplying a signal current which is in proportion to the video signal to the output line, however, a set current may be supplied to a different wiring than the signal line as shown in FIG. 5(B).

FIG. 5(B) shows a configuration in which a video signal is supplied from the second latch circuit 503 to a video signal line of a pixel and a set current is supplied from the current source to a current output line which is connected to the pixel through a changing over circuit. In FIG. 5(B), sw505 is not required to be disposed. Then, a video signal is inputted from the second latch circuit 503 to the pixel through video lines $B_m$, $B_{(m+1)}$, and $B_{(m+2)}$. The other configurations are similar to the ones in FIG. 5(A), therefore, the description is omitted here.

In this manner, the variations of signal current can be almost completely removed by using the current source for supplying a set current and the changing over circuit. Therefore, a display unevenness of the light emitting device can be almost completely removed by the signal line driver circuit in this embodiment mode.

[Embodiment Mode 4]

In this embodiment mode, a specific example of the configuration of a signal line driver circuit of which set signal corresponds to a latch pulse, that is different than Embodiment Mode 2 is described.

Figure 6:
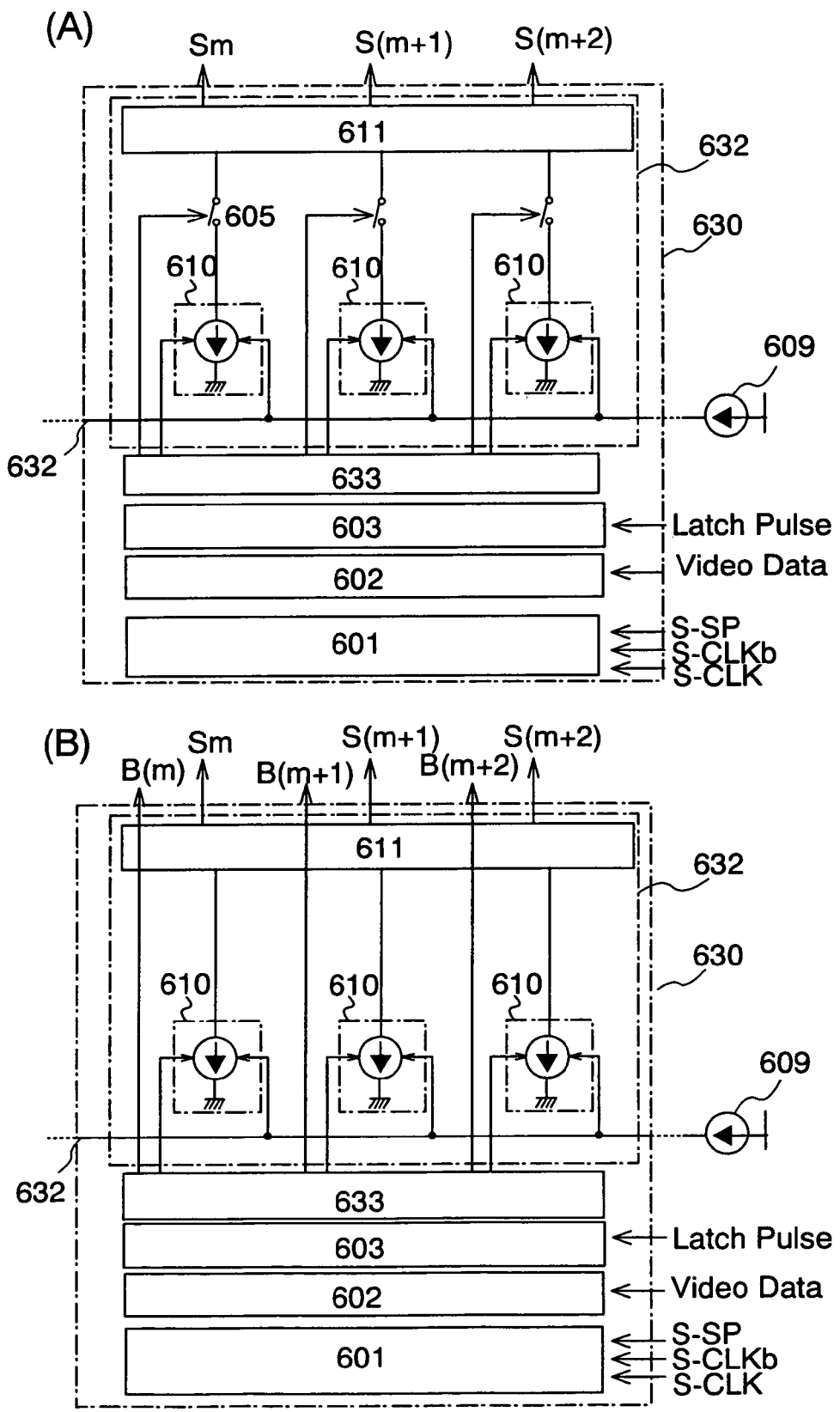
FIG. 6 is diagram showing configurations of the signal line driver circuit of the invention.

FIG. 6(A) shows a schematic diagram of a signal line driver circuit in the periphery of signal lines of from m-th column to (m+2)th column. The signal line driver circuit comprises a plurality of current sources 610, a current source circuit having a changing over circuit 611, a shift register 601, a first latch circuit 602, and a second latch circuit 603. A switch 605 for controlling whether or not to supply a set signal from the current source is also provided. The set signal is inputted from the changing over circuit 611 to a pixel through current output lines $S_m$, $S_{(m+1)}$, and $S_{(m+2)}$.

A video signal is not directly inputted to the current source circuit, but through a logic operator 633 because the video signal is used for controlling the pixel as well. That is to say, a set signal inputted from a terminal a corresponds to a signal supplied from an output terminal of a logic operator connected to a set control line.

The set signal in this embodiment mode corresponds to a signal supplied from the logic operator connected to a set control line (not shown in FIG. 6(A)). One terminal of the logic operator is inputted with a signal supplied from the second latch circuit 603 (corresponds to a video signal) and the other is inputted with a signal from the set control line. The logic operator performs logical operations of two inputted signals to output the set signal. In this embodiment mode, the current sources 610 are set in accordance with the signals supplied from the logic operator connected to a set control line.

As in Embodiment Mode 2, when a High video signal is inputted to the switch 605, a set current is supplied from the current source 610 to the signal line. On the other hand, when a Low video signal is inputted to the switch 605, a set current is not supplied to the signal line. That is to say, the current source 610 has a function (VGS) to supply a set current, and whether or not to supply a set current to the pixel is controlled by the switch 605.

After that, an electrical connection between the current source and the signal line is changed over in each certain period by the changing over circuit 611.

The current source can arbitrarily employ any of the configurations of the current sources shown in FIGS. 3 and 4. Also, the current source circuit may employ different configurations in combination as well as employing a single configuration.

In this embodiment mode, a set signal is inputted to the current sources 610 by using two signals: a signal (video signal) outputted from the second latch circuit 603 and a signal outputted from the set control line. Therefore, the set operation can be performed by specifying an arbitrary current source among the plurality of current sources 610, that is different than the case of sampling pulse.

Described with reference to FIG. 6(A) is the case of supplying a signal current which is in proportion to a video signal to an output line, however, a set current may be supplied to a different wiring than the output line.

FIG. 6(B) shows a circuit configuration in which a video signal is supplied to a video signal line of a pixel through a logic operator and a set current is supplied from the current source through the changing over circuit to the current output line which is connected to the pixel. In the case of FIG. 6(B), SW605 is not required to be disposed. The video signals are inputted to the pixels from a logic operator 633 through video lines $B_m$, $B_{(m+1)}$, and $B_{(m+2)}$. The other configuration are similar to the ones in FIG. 6(A), therefore, the description is omitted here.

Further, the variations of signal current can be almost completely removed by using the current source for supplying a set current and the changing over circuit. Therefore, a display unevenness of the light emitting device can be almost completely removed by the signal line driver circuit in this embodiment mode.

[Embodiment Mode 5]

Subsequently, a specific example of the configuration of a signal line driver circuit provided with a plurality of shift registers, that is different than Embodiment Modes 2 and 3 is described.

FIG. 7(A) shows a schematic diagram of a signal line driver circuit 730 in the periphery of signal lines of m-th column to (m+2)th column. The signal line driver circuit comprises a plurality of current sources 710, a current source circuit 731 having a changing over circuit 711, a first shift register 701, a second shift register 702, a first latch circuit 703, and a second latch circuit 704. A switch 705 for controlling whether or not to supply a set signal from the current source is also provided. The set signal is inputted from the changing over circuit 711 to a pixel through current output lines $S_m$, $S_{(m+1)}$, and $S_{(m+2)}$.

A sampling pulse outputted from the first shift register 701 is inputted to the current sources 710. The set signal in this embodiment mode corresponds to the sampling pulse.

The sampling pulse outputted from the second shift register 702 is inputted to the first latch circuit 703. After that, the first latch circuit 703 and the second latch circuit 704 perform a similar operation to Embodiment Mode 2, and one row of the video signals held in the second latch circuit 704 are inputted to the plurality of switches 705 of the current source circuit 731 at the same time.

As in Embodiment Mode 2, when a High video signal is inputted to a switch 705, a set current is supplied from the current source 710 to a signal line. On the other hand, when a Low video signal is inputted to the switch 705, a set current is not supplied to the signal line. That is to say, the current source 710 has a function (VGS) to supply a set current, and whether or not to supply a set current to the pixel is controlled by the switch 705.

After that, an electrical connection between the current source and the signal line is changed over in each certain period by the changing over circuit 711.

The current source in this embodiment mode can arbitrarily employ any of the configurations of the current sources shown in FIGS. 3 and 4. Also, the current source circuit may employ different configurations in combination as well as employing a single configuration.

Described with reference to FIG. 7(A) is the case of supplying a signal current which is in proportion to the video signal to the output line, however, a set current may be supplied to a different wiring than the signal line as shown in FIG. 7(B).

FIG. 7(B) shows a configuration in which a video signal is supplied through the second latch circuit 704 to a video signal line of a pixel and a set current is supplied from the current source through a changing over circuit to a current output line which is connected to the pixel. In FIG. 7(B), the switch 705 is not required to be disposed. Then, a video signal is inputted from the second latch circuit 704 to the pixel through video lines $B_m$, $B_{(m+1)}$, and $B_{(m+2)}$. The other configuration are similar to the ones in FIG. 7(A), therefore, the description is omitted here.

In this embodiment mode, by providing the first shift register 701 for controlling a set signal and the second shift register 702 for controlling a latch circuit, operations of the first shift register 701 and the second shift register 702 can be performed completely independently. For example, the second shift register 702 can be operated at a high rate while the first shift register 701 is operated at a low rate. In this manner, by operating the first shift register 701 at a low rate, a set operation of the current source 710 can be performed accurately.

Further, the variations of signal current can be almost completely removed by using the current source for supplying a set current and the changing over circuit. Therefore, a display unevenness of the light emitting device can be almost completely removed by the signal line driver circuit in this embodiment mode.

[Embodiment Mode 6]

A specific example of the configuration of a signal line driver circuit in which the first latch circuit 802 and the second latch circuit 803 each has a current source, that is different than Embodiment Modes 2 to 4.

Figure 8:
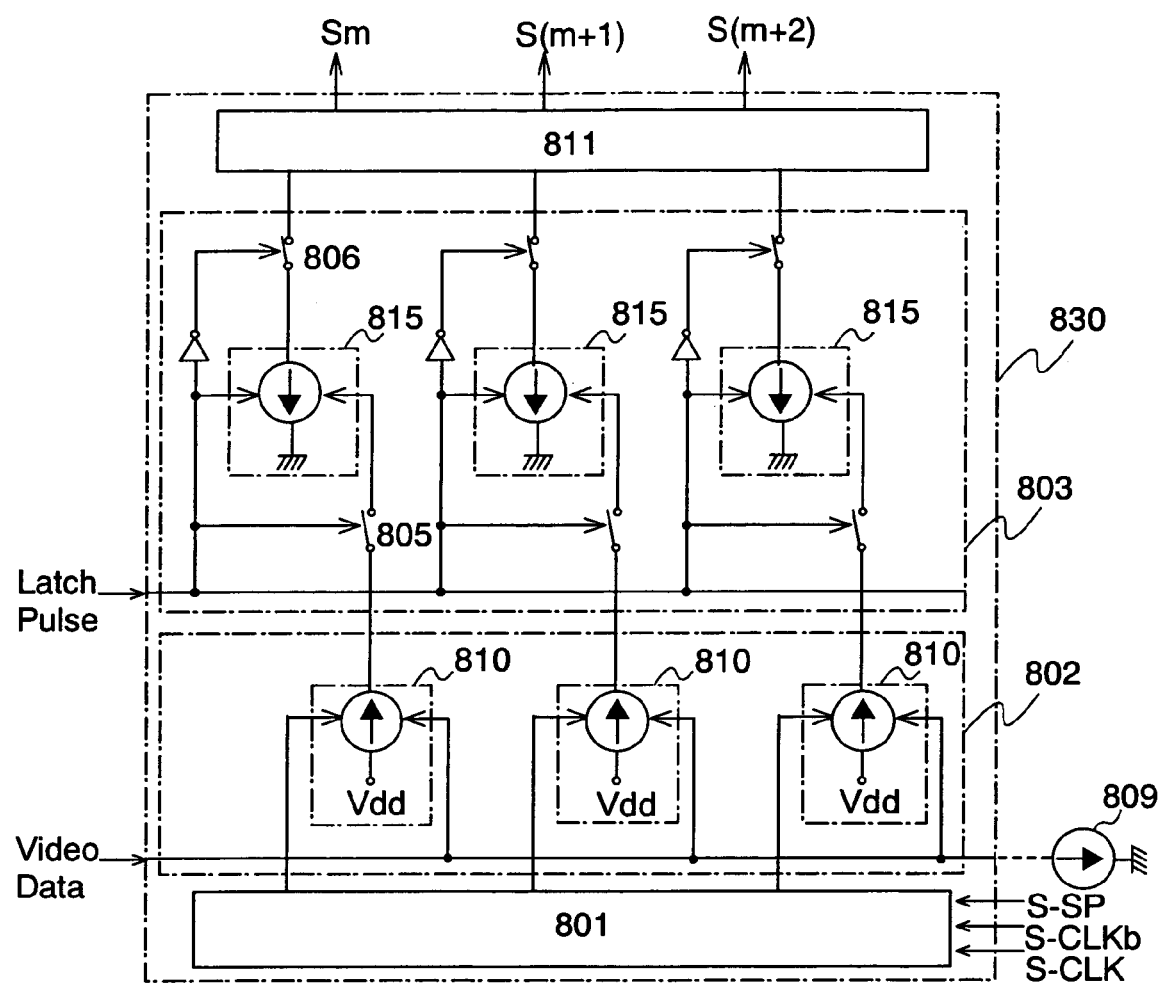
FIG. 8 is a diagram showing a configuration of the signal line driver circuit of the invention.

FIG. 8 is a schematic diagram of a signal line driver circuit 830 in the periphery of signal lines of from m-th column to (m+2)th column. The signal line driver circuit comprises a shift register 801, a first latch circuit 802, a second latch circuit 803, a first current source 810 of the first latch circuit, a second current source 815 of the second latch circuit, and a changing over circuit 811, and switches 805 and 806 are provided. A set signal is inputted from the changing over circuit 811 through current output lines $S_m$, $S_{(m+1)}$, and $S_{(m+2)}$ to a pixel.

The first current source 810 of the first latch circuit 802 is inputted with a set signal and supplied with a predetermined current (signal current) from a video signal constant current source 809. This set signal corresponds to a latch pulse supplied from the shift register 801 or from outside. The switch 805 is provided between the first current source 810 and the second current source 815, and ON/OFF of the switch 805 is controlled by a latch pulse.

The second current source 815 of the second latch circuit is inputted with a set signal and holds a current (set current) supplied from the first current source 810. This set signal corresponds to a latch pulse. The switch 806 is provided between the second current source 815 and the changing over circuit, and ON/OFF of the switch 806 is controlled by a latch pulse and inputted with an inverted signal to the first switch 805.

When a High video signal is inputted to a switch 806, a set current is supplied from the second current source 815 to a signal line as in Embodiment Mode 2. On the other hand, when a Low video signal is inputted to the switch 806, a set current is not supplied to the signal line. That is to say, the second current source 815 has a function (VGS) to supply a set current, and whether or not to supply a set current to the pixel is controlled by the switch 806.

After that, an electrical connection between the second current source and the signal line is changed over in each certain period by the changing over circuit 811.

The first current source 810 and the second current source 815 can arbitrarily employ any of the configurations of the current sources shown in FIGS. 3 and 4. Also, the current source circuit may employ different configurations in combination as well as employing a single configuration.

According to this embodiment mode, a current source can be disposed in the latch circuit, therefore, the area occupied by a signal line driver circuit can be scaled down. Further, narrower frame of a light emitting device can be achieved.

In this manner, the variations of signal current can be almost completely removed by using the current source circuit for supplying a set current and the changing over circuit. Therefore, a display unevenness of the light emitting device can be almost completely removed by the circuit of the invention.

[Embodiment Mode 7]

A specific example of a configuration of a signal line driver circuit having a pair of current sources in a latch circuit, that is different than Embodiment Modes 2 to 5 is described.

Figure 9:
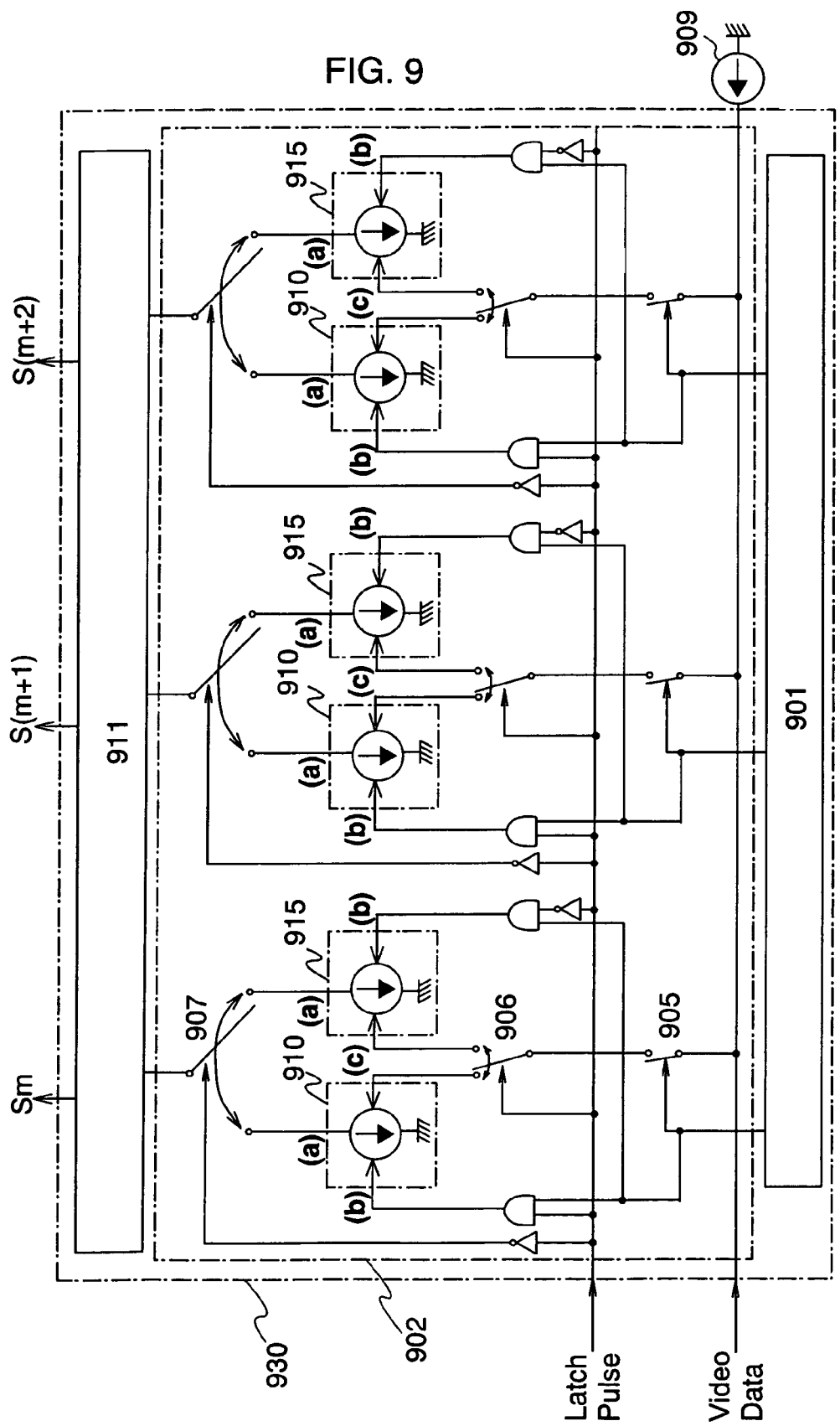
FIG. 9 is a diagram showing a configuration of the signal line driver circuit of the invention.

FIG. 9 is a schematic diagram of a signal line driver circuit 930 in the periphery of three signal lines of from m-th column to (m+2)th column. The signal line driver circuit comprises a shift register 901, a latch circuit 902, and a changing over circuit 911. The latch circuit 902 comprises a first current source 910 and a second current source 915. A set signal is inputted from the changing over circuit 911 through current output lines $S_m$, $S_{(m+1)}$, and $S_{(m+2)}$ to a pixel.

A first switch 905 is controlled by a sampling pulse inputted from the shift register 901. A second switch 906 and a third switch 907 are controlled by a latch pulse. The second switch 906 and the third switch 907 are inputted with inverted signals to each other. According to this embodiment mode as described above, a set operation can be performed in one of the first current source 910 and the second current source 915 while an input operation is performed in the other.

A set signal is inputted to the first current source 910 and the second current source 915 from the shift register 910, and a predetermined signal current is supplied from a video signal constant current source 909 through a video line. The set signal corresponds to a signal supplied from an output terminal of a logic operator. As for the logic operator, a sampling pulse from the shift register 901 is inputted to one of the current sources while a latch pulse is inputted to the other current source circuit. The logic operator supplies a signal by performing logical operations of inputted two signals. In this embodiment mode, current source is set in accordance with the signal supplied from the output terminal of the logic operator.

As in Embodiment Mode 2, when a High video signal is inputted to a switch 907, a set current is supplied from the first current source 910 or the second current source 915 to a signal line. On the other hand, when a Low video signal is inputted to the switch 907, a set current is not supplied to the signal line. That is to say, the current source 910 or the second current source 915 has a function (VGS) to supply a set current, and whether or not to supply a set current to the pixel is controlled by the switch 907.

After that, an electrical connection between the first current source 910 or the second current source 915 and the signal line is changed over in each certain period by the changing over circuit 911.

The first current source 910 and the second current source 915 in this embodiment mode can arbitrarily employ any of the circuit configurations of the current source circuits shown in FIGS. 3 and 4. Each current source circuit may employ different configurations in combination as well as employing a single configuration.

By providing the first current source 910 and the second current source 915 to each signal line, a set operation for setting a signal current and an input operation to the signal lines which are electrically connected by the changing over circuit 911 can be performed at the same time.

In this manner, the variations of signal current can be almost completely removed by using the current source circuit for supplying a set current and the changing over circuit. Therefore, a display unevenness of the light emitting device can be almost completely removed by the circuit of the invention.

[Embodiment Mode 8]

A specific example of a configuration of a signal line driver circuit which is different than Embodiment Modes 2 to 6 is described.

Figure 10:
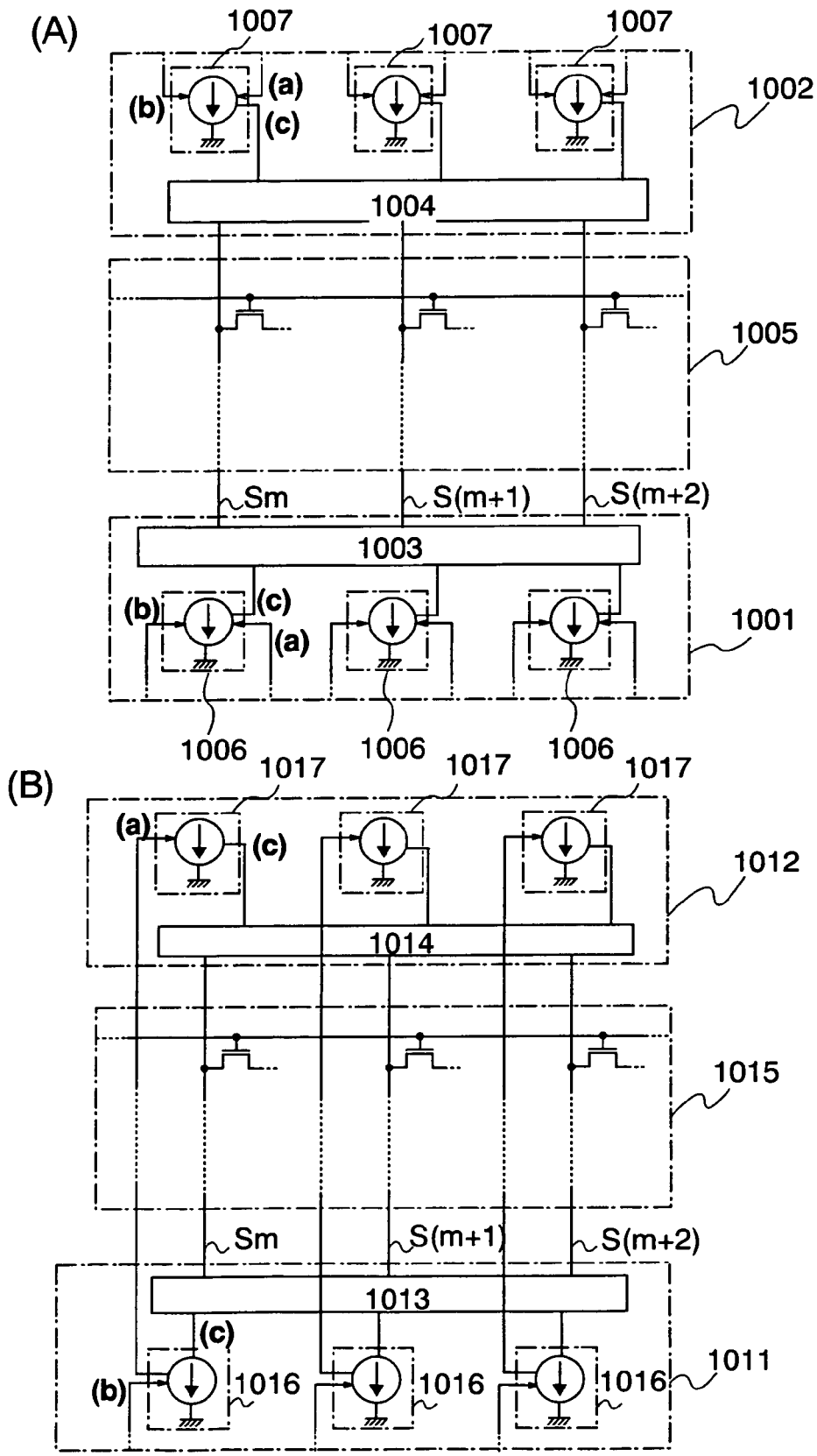
FIG. 10 is a diagram showing a configuration of the signal line driver circuit of the invention.

FIG. 10A shows a first signal line driver circuit 1001, a second signal line driver circuit 1002, a first changing over circuit 1003, a second changing over circuit 1004, a pixel portion 1005, a current source 1006 of the first signal line driver circuit 1001, and a current source 1007 of the second signal line driver circuit 1002. A set signal is inputted from the first changing over circuit 1003 and the second changing over circuit 1004 through current output lines $S_m$, $S_{(m+1)}$, and $S_{(m+2)}$ to a pixel.

The first signal line driver circuit 1001 and the second signal line driver circuit 1002 can arbitrarily employ any of the configurations of Embodiment Modes 2 to 6. Also, the first signal line driver circuit 1001 and the second signal line driver circuit 1002 do not have to have identical configurations, but may employ different configurations in combination which are described in Embodiment Modes 2 to 6.

A set current is written to a pixel portion 1005 from a current source 1006 through signal lines which are electrically connected thereto. The value of this set current is small, therefore, it is a problem that a long time is required for writing to the pixel. In view of this, in this embodiment mode, a set current supplied from the current source 1006 is set so that a somewhat large value can be added to the set current to be supplied to the pixel and the current source 1007 can supply the added set current.

Specifically, the value of the set current to be supplied to the pixel is denoted as X. At this time, a set current supplied from the current source 1006 is X+Y (X<<Y) and a set current supplied from the current source 1007 is Y. Then, the value of the set current flowing through the signal lines of the pixel becomes large as X+Y, and writing the pixel can be performed at a higher rate.

A signal line to be electrically connected to the current source 1006 is changed over by the first changing over circuit 1003 and a signal line to be electrically connected to the current source 1007 is also changed over by the second changing over circuit 1004. At this time, the current sources 1006 and 1007 which are electrically connected to one single line do not have to be disposed in the identical column (position). Note that the second changing over circuit 1004 does not have to be provided.

By providing the first signal line driver circuit and the second signal line driver circuit, the time required for writing a signal current can be reduced and the writing to the pixel can be performed at a higher rate.

A signal line driver circuit having a different configuration than the one in FIG. 10A is described with reference to FIG. 10B. FIG. 10B shows a first signal line driver circuit 1011, a second signal line driver circuit 1012, a first changing over circuit 1013, a second changing over circuit 1014, a pixel portion 1015, a current source 1016 of the first signal line driver circuit 1011, and a current source 1017 of the second signal line driver circuit 1012.

In FIG. 10B, a set current supplied from the first current source 1016 is supplied to the second current source 1017 to perform a set operation of the second current source 1017. The other configuration is similar to that of FIG. 10A, therefore, the description is omitted here.

According to the configuration shown in FIG. 10B, an area occupied by the second signal line driver circuit 1012 can be reduced while the pixel portion can occupy a larger area. By providing the first signal line driver circuit and the second signal line driver circuit, the time required for writing the signal current to the pixel can be shortened.

The variations of signal current can be almost completely removed by using the current source for supplying a set current and the changing over circuit. Therefore, a display unevenness of the light emitting device can be almost completely removed by the signal line driver circuit in this embodiment mode.

[Embodiment Mode 9]

As shown in FIG. 11, the changing over circuit of the invention is not limited to be connected to three output lines of which current sources are disposed adjacently (for example, signal lines. Hereinafter description is made as signal lines) as long as two or more signal lines are provided and an electrical connection between the power supply and the signal line is changed over in each certain period. A connecting configuration of a changing over circuit which is different than FIG. 11 is described in this embodiment mode with reference to FIG. 12.

Figure 12:
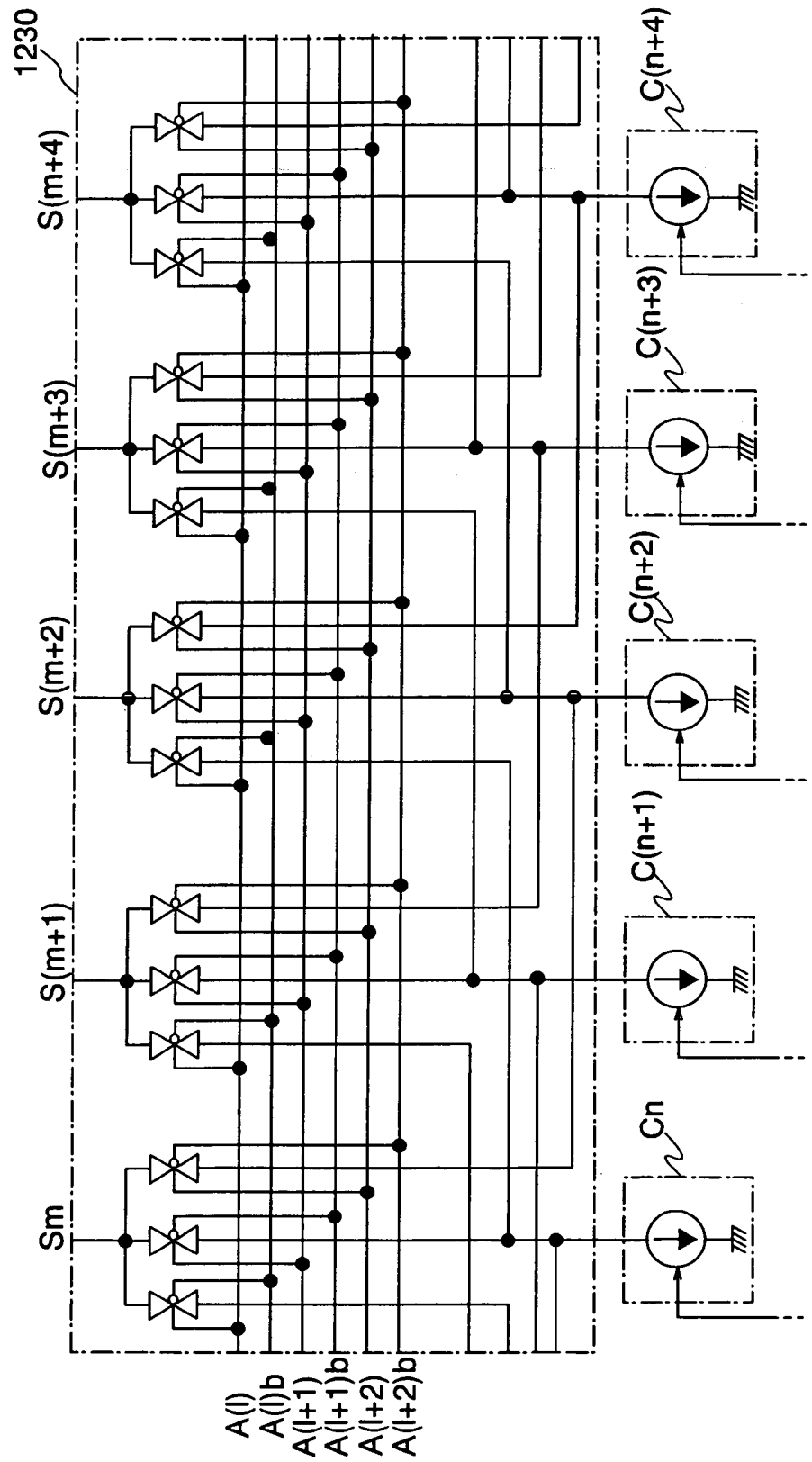
FIG. 12 is a diagram showing a configuration of the signal line driver circuit of the invention.

FIG. 12 shows a changing over circuit 1230 in the periphery of signal lines of m-th column to (m+4)th column, and a plurality of current sources $C_n$, $C_{(n+1)}$, $C_{(n+2)}$, $C_{(n+3)}$, and $C_{(n+4)}$. The changing over circuit shown in FIG. 12 is different in configuration than the one in FIG. 11 in the respect that each signal line is connected to every other current source. For example, as for a signal line $S_{(m+2)}$, among first to third analog switches connected to the signal line $S_{(m+2)}$, the first analog switch is connected to the current source CD, the second analog switch is connected to the current source $C_{(n+2)}$, and the third analog switch is connected to the current source $C_{(n+4)}$.

As described above, the signal input lines A(l) to A(l+2) and A(l)b to A(l+2)b are each inputted with an inverted signal and selected sequentially. An analog switch connected to the selected signal input line is turned ON and a current source connected to the analog switch which is turned ON and a signal line are electrically connected, thus a set current is supplied from the current source to the signal line.

As in this embodiment mode, a signal line and a current source may be connected at some distance in the changing over circuit. Also, in the changing over circuit, the more the current sources are connected to the signal line, the more uniform set current can be supplied to the signal line because many current sources can be used to change over the electrical connection.

[Embodiment Mode 10]

In this embodiment mode, a configuration having a group of current source circuit including a plurality of current sources as shown in FIG. 1(B), a changing over circuit provided with a group of analog switches including a plurality of analog switches, and an output line through which a set current is supplied (for example, a signal line. Hereinafter description is made as a signal line), that is different than those in FIGS. 11 and 12 is described with reference to FIG. 13.

Figure 13:
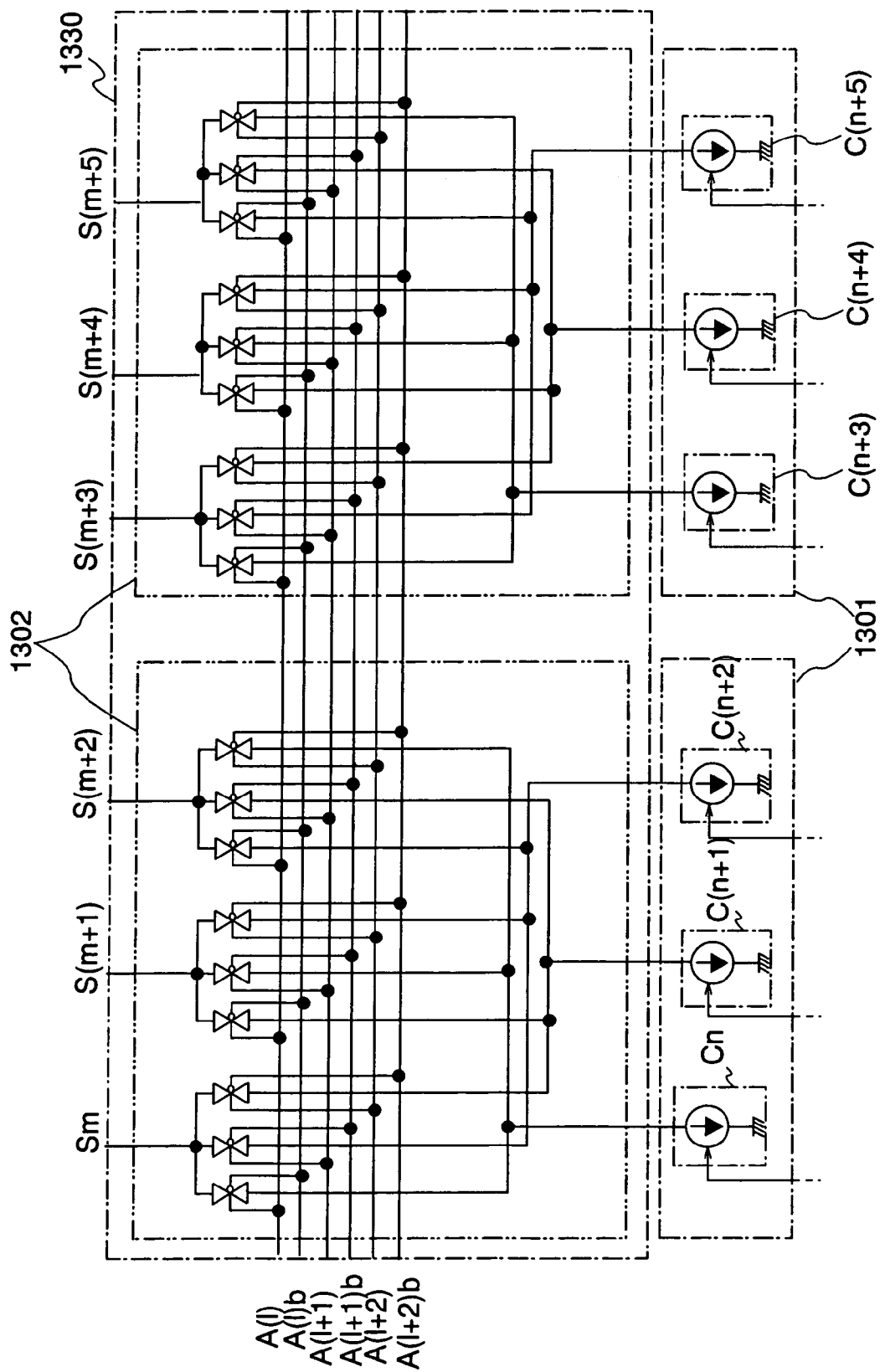
FIG. 13 is a diagram showing a configuration of the signal line driver circuit of the invention.

FIG. 13 shows a changing over circuit 1330 in the periphery of signal lines of m-th column to (m+5)th column and a plurality of current sources, similarly to FIG. 12. The changing over circuit shown in FIG. 13 is different than those in FIGS. 11 and 12 in configuration in the respect that a group of current source circuit 1301 including a plurality of current sources (three current sources in FIG. 13) and a group of analog switches 1302 including a plurality of analog switches (three analog switches in FIG. 13) are shown. The other configurations are similar to the one in FIG. 12, therefore, the description is omitted here.

Similarly to the aforementioned operations, in each group of current source circuit, the signal input lines A(l) to A(l+2) and A(l)b to A(l+2)b are each inputted with an inverted signal and selected sequentially. An analog switch connected to the selected signal input line is turned ON and a current source connected to the analog switch which is turned ON and a signal line are electrically connected, thus a set current is supplied from the current source to the signal line.

By providing current sources and analog switches in groups like the group of current source circuit 1301 and the group of analog switches 1302, it can be avoided that connecting wirings between the analog switches and current sources become complicated. Further, in order to reduce the variations among the group of current source circuits 1301 and among the group of analog switches 1302, the second changing over circuit may be disposed between the group of current source circuits and the group of analog switches. Note that the current sources in the group of current source circuits and the analog switches in the group of analog switches may be provided as many as required as far as they are provided in plural numbers.

[Embodiment Mode 11]

In this embodiment mode, a driving method of a circuit including a method of operation that a current source circuit performs a set operation and a method of operation to change over an electrical connection between a current source and an output line (for example, a signal line. Hereinafter description is made as a signal line) is described.

As for the driving method, there is a driving method in which one frame period is not divided (here described as a full frame method) and a driving method in which one frame period is divided into a plurality of subframes (here described as a subframe method). In this embodiment mode, the full frame method is described with reference to FIG. 14.

Figure 14:
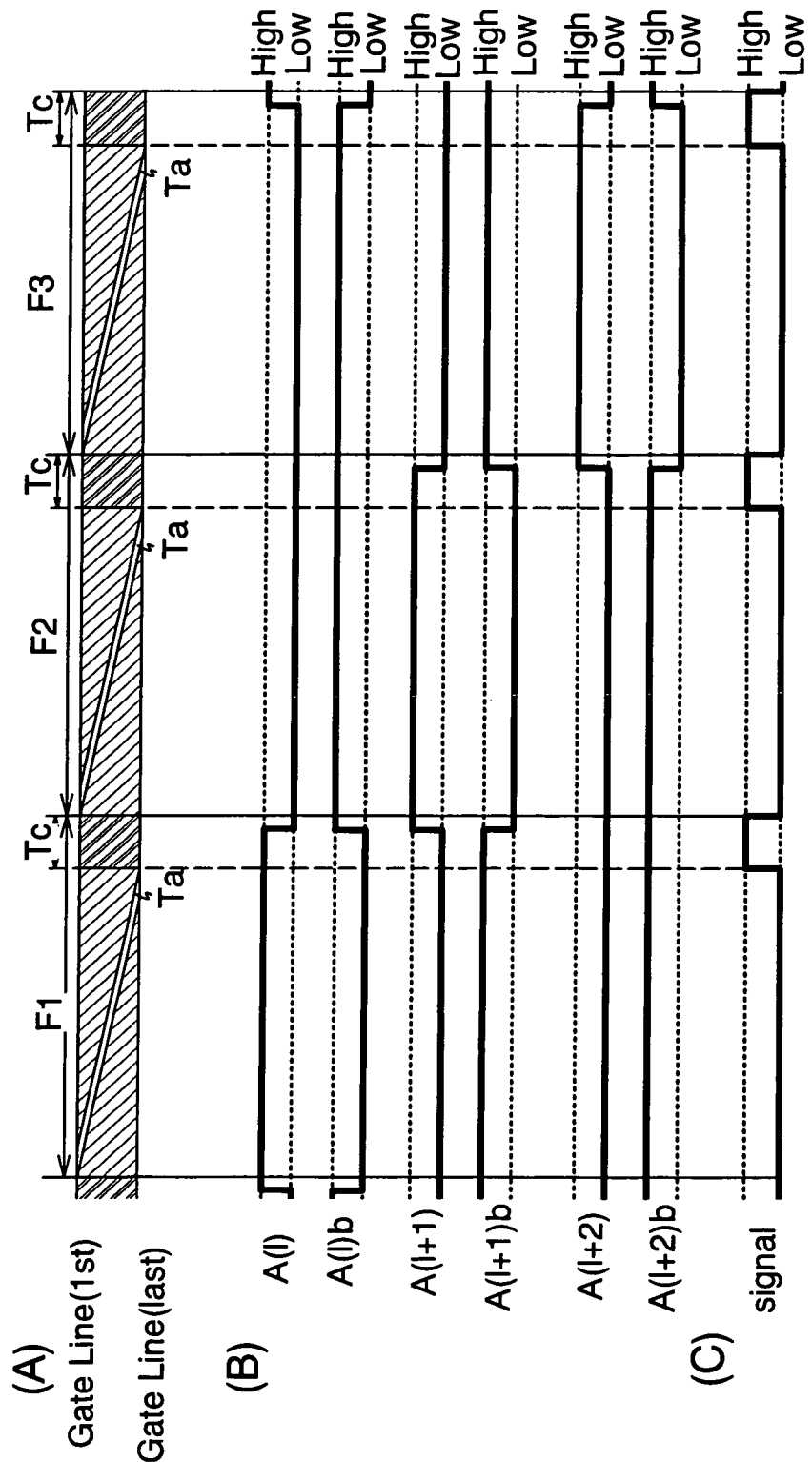
FIG. 14 is a timing chart of the signal line driver circuit of the invention.

FIG. 14(A) shows frame periods F1 to F3 in which scan lines (Gate Line) are selected from the first row (1st) to the last row (last), a write period Ta in which current (set current) is inputted to a pixel in each frame period, and a period Tc provided at the beginning or the end of each frame period (provided at the end in FIG. 14).

FIG. 14(B) shows a timing (wave shape) of High or Low of a signal inputted to signal input lines A(l) to A(l+2) and A(l)b to A(l+2)b. Note that signals inputted to the signal input lines A(l), A(l+1), and A(l+2) and signals inputted to the signal input lines A(l)b, A(l+1)b, and A(l+2)b are inverted signals to each other. Then, a period (timing) in which a signal inputted to the signal line is changed over is provided in each period Tc.

FIG. 14(C) shows a method of operation in which a current source circuit performs a set operation, that is a timing (wave shape) of High or Low of a set signal (signal) inputted to a current source. When the set signal becomes High, a set operation is performed to each current source. In the case of performing a set operation to each current source sequentially and the setting of all the current sources cannot be completed, it may be performed in the periods Tc in a plurality of frame periods.

It should be noted that setting of a current source of an arbitrary place (column) may be performed in each frame. In FIG. 14(C), for example, a High set signal may be inputted to a current source of i-th column may be performed in a period Tc of a first frame, a current source of j-th column in a period Tc of a second frame, and a current source of k-th column in a period Tc of a third frame to perform a set operation.

In the frame period F1, signal input lines A(l) and A(l)b are selected and analog switches connected to these are turned ON, thus a current source connected to the analog switches which are turned ON and a signal line are electrically connected. In the write period Ta, current (set current) is outputted to a signal line which is electrically connected to each current source and a set signal is inputted in the period Tc to perform a set operation to each current source. At this time, a set operation may be performed to a current source of any place and of any number.

In the frame period F2, signal input lines A(l+1) and A(l+1)b are selected and analog switches connected to these are turned ON, thus current sources connected to the analog switches which are turned ON and signal lines are electrically connected. In the write period Ta, current (set current) is outputted to a signal line which is electrically connected to each current source and a set signal is inputted in the period Tc to perform a set operation to each current source. At this time, a set operation may be performed to a current source of any place and of any number.

In the frame period F3, signal input lines A(l+2) and A(l+2)b are selected and analog switches connected to these are turned ON, thus a current source connected to the analog switches which are turned ON and a signal line are electrically connected. In the write period Ta, current (set current) is outputted to a signal line which is electrically connected to each current source and a set signal is inputted in the period Tc to perform a set operation to each current source. At this time, a set operation may be performed to a current source of any place and of any number.

In the period Tc, an operation (timing) to perform a set operation to current source and an operation (timing) to change over an electrical connection by the changing over circuit may be performed at the same time or one of them prior to the other. Further, the order and length of the period Tc is not particularly limited, however, it is required to be provided so as not to overlap the write period.

As described above, even when a set current varies, a display appears uniform to human eyes by a method of operation in which a changing over operation and a set operation are performed in a short period Tc. Therefore, a display unevenness of a light emitting device can almost completely removed by a driving method of a signal line driver circuit of the invention.

[Embodiment Mode 12]

In this embodiment mode, in the subframe method a driving method of a circuit including a method of operation that a current source circuit performs a set operation and a method of operation to change over an electrical connection between a current source and an output line (for example, a signal line. Hereinafter description is made as a signal line) is described with reference to FIG. 15.

Figure 15:
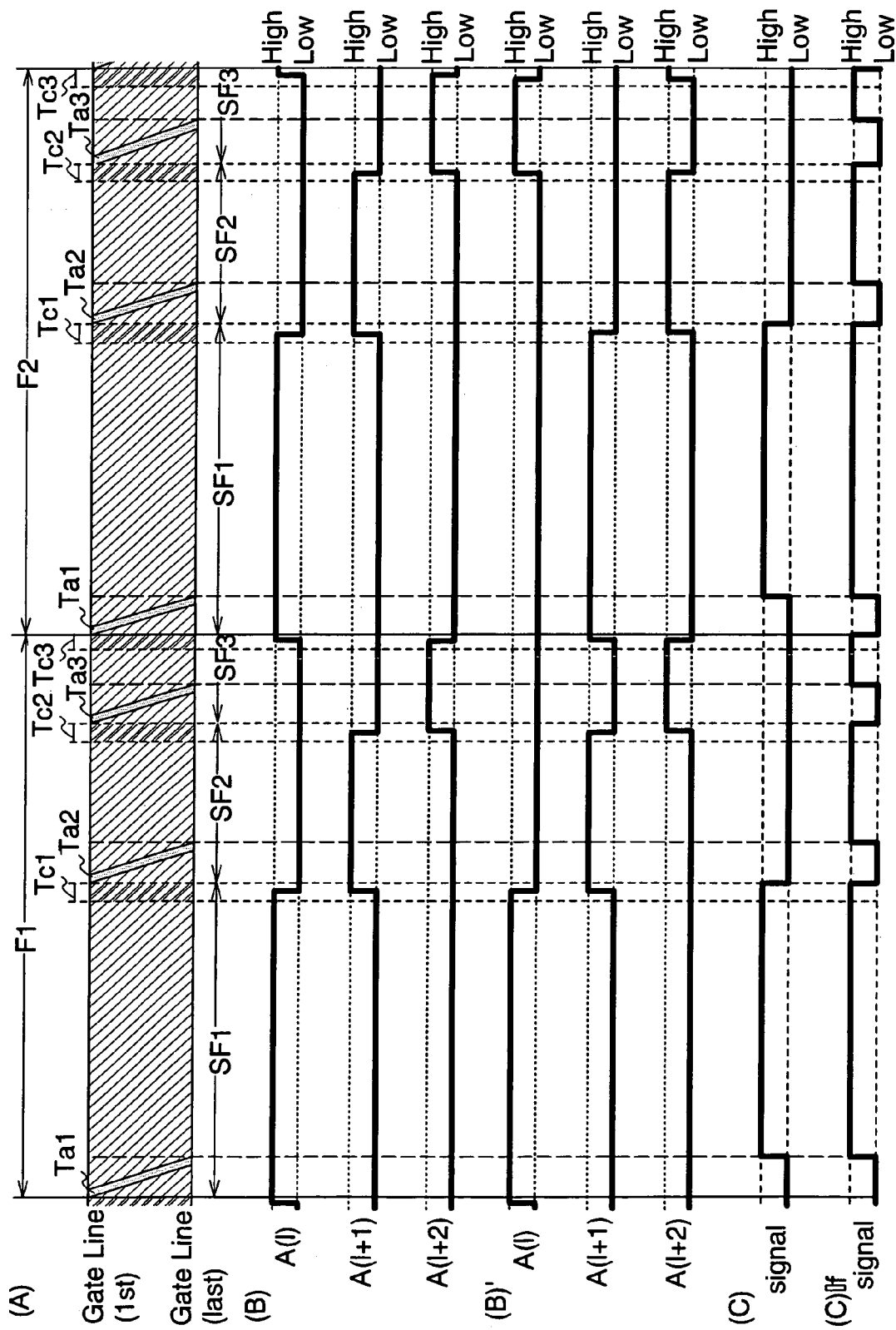
FIG. 15 is a timing chart of the signal line driver circuit of the invention.

FIG. 15(A) shows frame periods F1 and F2 including a frame period in which scan lines (Gate Line) are selected from the first row (1st) to the last row (last) is divided into three subframes: SF1, SF2, and SF3, write periods Ta1, Ta2, and Ta3 in which current (set current) is inputted to a pixel in each subframe period, and periods Tc1, Tc2, and Tc3 provided at the beginning or the end of each subframe period (provided at the end of a frame in FIG. 15).

FIG. 15(B) shows a timing (wave shape) of High or Low of a signal inputted to signal input lines A(l) to A(l+2) in the changing over circuit. Similarly to FIG. 14, inverted signals of the signal input lines A(l), A(l+1), and A(l+2) are inputted to the signal input lines A(l)b, A(l+1)b, and A(l+2)b through not shown in FIG. 15(B). And then a period (timing) in which a signal inputted to the signal line is changed over is provided in each of the periods Tc1 to Tc3.

FIG. 15(B)' shows an example that an order in which High or Low of a signal inputted to a signal input line is inputted, in other words that an order of selecting the signal input line is different. As compared to a method of operation in which the order of selecting the signal lines is fixed (in all SF1, A(l) is ON, in all SF2, A(l+1) is ON, and in all SF3, A(l+2) is ON in each frame) from the subframe period SF1 to SF3 as shown in FIG. 15(B), a method of operation in which the order of selecting the signal input line is different in each subframe period as shown in FIG. 15(B)' can suppress variations of set current more, thus a uniform display can be obtained.

FIG. 15C shows a method of operation in which a current source circuit performs a set operation, that is a timing (wave shape) of High or Low of a set signal (signal) inputted to a current source is described. In FIG. 15C, a High set signal is inputted in each subframe SF1 only.

In addition, in FIG. 15C', a High set signal is inputted in each subframe period SF1 to SF3, that is different from FIG. 15C'.

As described above, in case that a subframe method is used, longer time can be set for other periods than the write period as compared to a full frame method. Therefore, a period for setting a signal current can be set long. In the method of operation in FIG. 15C', a period in which a High set signal is inputted is the longest.

In this embodiment mode, current source of an arbitrary place (column) may be set in each subframe as in FIG. 14. In case that a set operation is performed to each current source sequentially and that a setting of all the current sources is not completed, it may be performed in the periods Tc in a plurality of frame periods.

Note that the method of operation of the signal input lines shown in FIG. 15(B) or 15(B)' and the method of operation of the set signals shown in FIG. 15C or 15C' may be combined in any way.

Further, a period in which High of a set signal is inputted may be provided so as not to overlap the periods Tc1 to Tc3. In that case, after a set operation to a current source circuit is finished, an electrical connection between the current source circuit and a signal line can be changed over by a changing over circuit. Thus, a malfunction of a circuit is reduced and a current (set current) can be certainly inputted to a pixel.

In this manner, in the case of driving by the subframe method, a period for setting a signal current can be long and an accurate set current can be supplied.

[Embodiment Mode 13]

In this embodiment mode, a driving method of a circuit including a method of operation that a current source circuit performs a set operation and a method of operation to change over an electrical connection between a current source and an output line (for example, a signal line. Hereinafter description is made as a signal line) in the case of providing two signal line driver circuits as in Embodiment Mode 7 is described.

In the signal line driver circuit as described in Embodiment Mode 7, a timing of a High set signal in FIGS. 14 and 15 is divided into two (for example, the first half and last half). In one of them, a current source of a first signal line driver circuit may be set while in the other one a current source of a second signal line driver circuit is set.

The methods of operation of the other signal lines and set signals are the same as described in Embodiment Mode 10 or 11, therefore, the description is omitted here.

The variations of signal current can be almost completely removed by the method of operation in this embodiment mode. Therefore, a display unevenness of the light emitting device can be almost completely removed by the driving method of the signal line driver circuit in this embodiment mode.

[Embodiment Mode 14]

Figure 16:
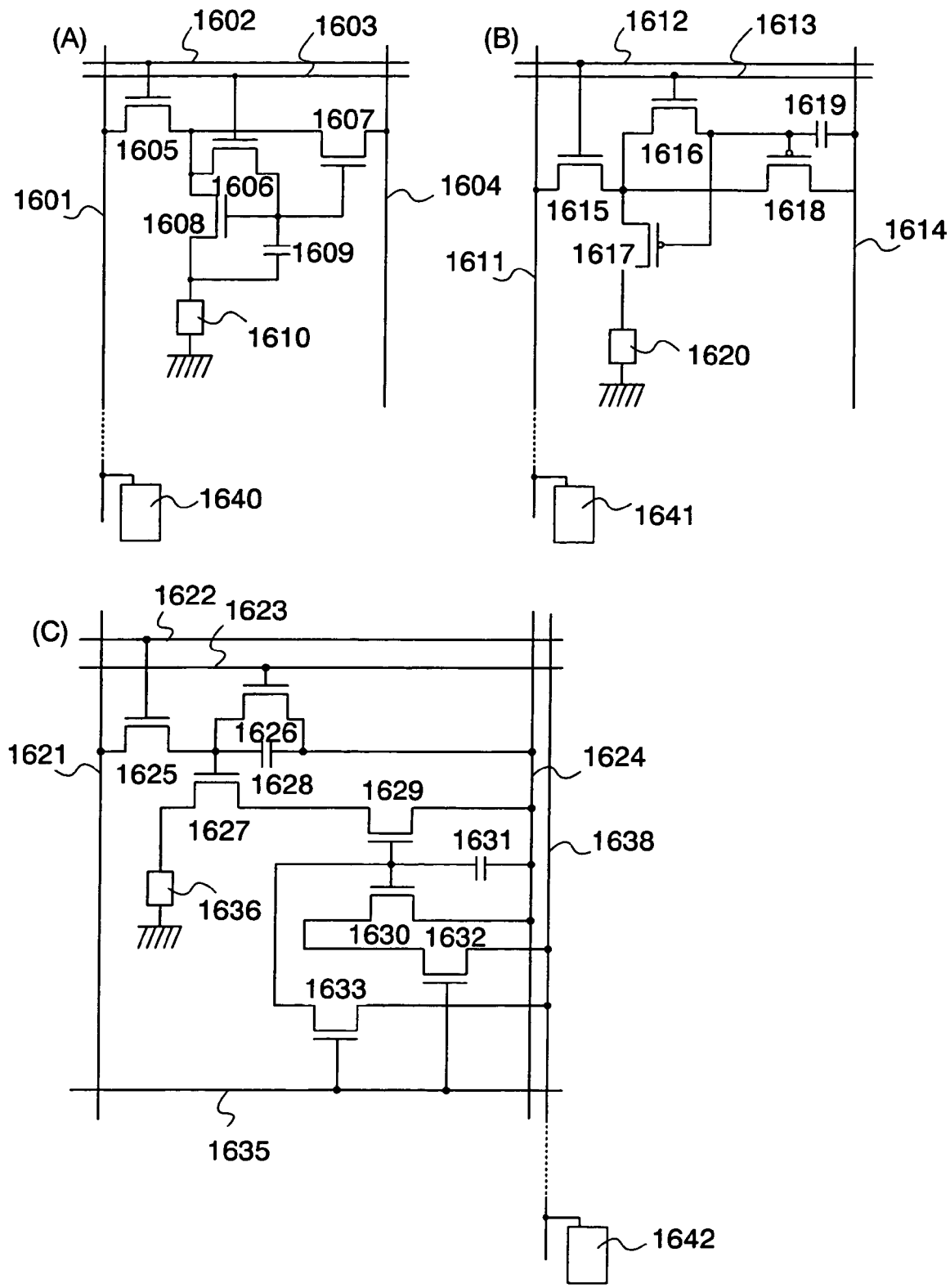
FIG. 16 is diagram showing pixel configurations of the light emitting device of the invention.

In this embodiment mode, a configuration example of a circuit of a pixel provided in a pixel portion is described with reference to FIG. 16.

A pixel shown in FIG. 16(A) comprises a signal line 1601, first and second scan lines 1602 and 1603, a power supply line 1604, a first transistor 1605 for switching, a second transistor 1606 for holding, a third transistor 1607 for driving, a fourth transistor 1608 for convert driving, a capacitor 1609, and a light emitting element 1610. Note that each signal line is connected to a current source circuit 1640.

A gate electrode of the first transistor 1605 is connected to the first scan line 1602, a first electrode thereof is connected to the signal line 1601, and a second electrode thereof is connected to a first electrode of the third transistor 1607 and a first electrode of the fourth transistor 1608. A gate electrode of the second transistor 1606 is connected to the second scan line 1603, a first electrode thereof is connected to a second electrode of the first transistor 1605 and a first electrode of the fourth transistor 1608, and a second electrode thereof is connected to a gate electrode of the third transistor 1607 and a gate electrode of the fourth transistor 1608. A second electrode of the third transistor 1607 is connected to the power supply line 1604 and a second electrode of the fourth transistor 1608 is connected to one of electrodes of the light emitting element 1610. The capacitor 1609 is connected between the gate electrode of the fourth transistor 1608 and the second electrode thereof and holds a gate-source voltage of the fourth transistor 1608. The power supply line 1604 and the other electrode of the light emitting element 1610 are each inputted with a predetermined potential, having a potential difference to each other.

A pixel shown in FIG. 16(B) comprises a signal line 1611, first and second scan lines 1612 and 1613, a power supply line 1614, a first transistor 1615 for switching, a second transistor 1616 for holding, a third transistor 1617 for driving, a fourth transistor 1618 for convert driving, a capacitor 1619, and a light emitting element 1620. Note that each signal line is connected to a power supply circuit 1641.

A gate electrode of the first transistor 1615 is connected to the first scan line 1612, a first electrode thereof is connected to the signal line 1611, a second electrode thereof is connected to a first electrode of the third transistor 1617 and a first electrode of the fourth transistor 1618. A gate electrode of the second transistor 1616 is connected to the second scan line 1613, a first electrode thereof is connected to the first electrode of the third transistor 1617, and a second electrode thereof is connected to a gate electrode of the fourth transistor 1618 and the gate electrode of the fourth transistor 1618. A second electrode of the fourth transistor 1618 is connected to the power supply line 1614, and a second electrode of the third transistor 1617 is connected to one of electrodes of the light emitting element 1620. The capacitor 1619 is connected between the gate electrode of the fourth transistor 1618 and the second electrode thereof and holds a gate-source voltage of the fourth transistor 1618. The power supply line 1614 and the other electrode of the light emitting element 1620 are each inputted with a predetermined potential, having a potential difference to each other.

A pixel shown in FIG. 16(C) comprises a video line 1621, a first scan line 1622, a second scan line 1623, a third scan line 1635, a first power supply line 1624, a second power supply line (current line) 1638, a first transistor 1625 for switching, a second transistor 1626 for erasing, a third transistor 1627 for driving, a capacitor 1628, a fourth transistor 1629 for current source, a fifth transistor 1630 for a current mirror circuit, a capacitor 1631, a sixth transistor 1632 for current input, a seventh transistor 1633 for holding, and a light emitting element 1636. Note that each signal line is connected to a power supply circuit 1641.

A gate electrode of the first transistor 1625 is connected to the first scan line 1622, a first electrode of the first transistor 1625 is connected to the video line 1621, a second electrode of the first transistor 1625 is connected to a gate electrode of the third transistor 1627 and a first electrode of the second transistor 1626. A gate electrode of the second transistor 1626 is connected to the second scan line 1623 and a second electrode of the second transistor 1626 is connected to the first power supply line 1624. A first electrode of the third transistor is connected to one of electrodes of the light emitting element 1636 and a second electrode of the third transistor 1627 is connected to a first electrode of the fourth transistor 1629. A second electrode of the fourth transistor 1629 is connected to the first power supply line 1624. One of electrodes of the capacitor 1631 is connected to a gate electrode of the fourth transistor 1629 and a gate electrode of the fifth transistor 1630 while the other is connected to the first power supply line 1624. A first electrode of the fifth transistor 1630 is connected to the first power supply line 1624 and a second electrode of the fifth transistor 1630 is connected to a first electrode of the sixth transistor 1632. A second electrode of the sixth transistor 1632 is connected to the second power supply line 1638 and a gate electrode of the sixth transistor 1632 is connected to the third scan line 1635. A gate electrode of the seventh transistor 1633 is connected to the third scan line 1635, a first electrode of the seventh transistor 1633 is connected to the second power supply line (current line) 1638, and a second electrode of the seventh transistor 1633 is connected to the gate electrode of the fourth transistor 1629 and the gate electrode of the fifth transistor 1630. The first power supply line 1624 and the other of electrodes of the light emitting element 1636 are each inputted with a predetermined potential, having a potential difference to each other.

According to such pixel configuration and current source to suppress variations of the transistors, a light emitting device which displays an image of higher precision without display unevenness can be provided.

[Embodiment]
[Embodiment 1]

Figure 17:
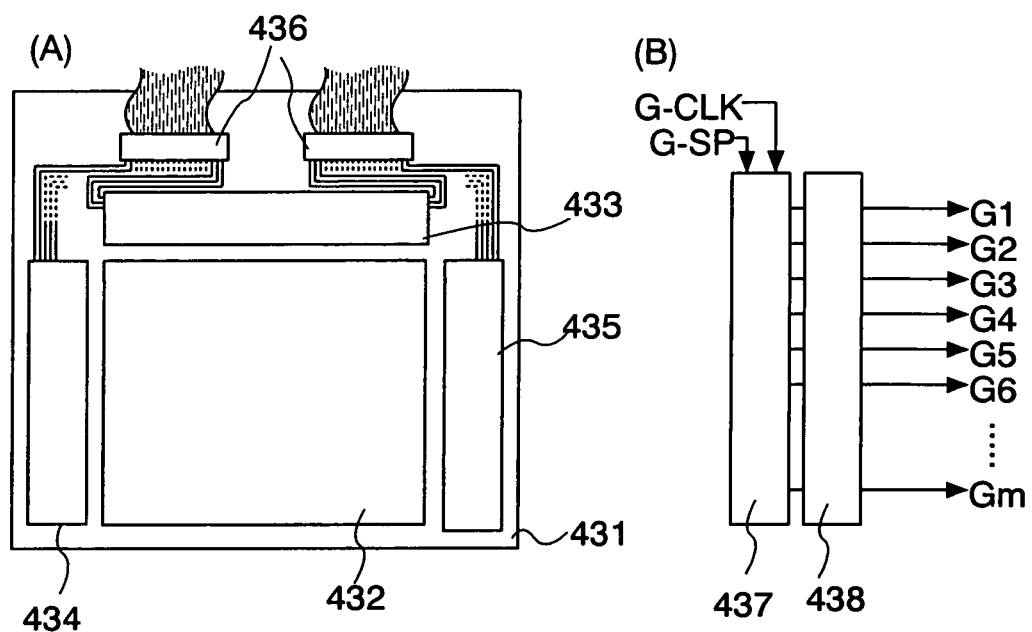
FIG. 17 is diagram showing the light emitting device of the invention.

In this embodiment, a structure of the light emitting device of the invention is described with reference to FIG. 17.

The light emitting device of the invention comprises on a substrate 431 a pixel portion 432 over which a plurality of pixels are disposed in matrix, a signal line driver circuit 433 of the invention, a first scan line driver circuit 434 and a second scan line driver circuit 435 in the periphery of the pixel portion 432. In FIG. 17(A), the signal line driver circuit 433 and two pairs of the scan line driver circuits 434 and 435 are provided, however, the invention is not limited to this and can be arbitrarily designed according to a pixel configuration. Further, a signal is supplied from outside to the signal line driver circuit 433, the first scan line driver circuit 434 and the second scan line driver circuit 435 through an FPC 436.

Configurations of the first scan line driver circuit 434 and the second scan line driver circuit 435 are described with reference to FIG. 17(B). The first scan line driver circuit 434 and the second scan line driver circuit 435 comprise a shift register 437 and a buffer 438. To describe the operation briefly, the shift register 437 outputs a sampling pulse sequentially in accordance with a clock signal (G-CLK), a start pulse (S-SP), and a clock inverted signal (G-CLKb). After that, the sampling pulse amplified in the buffer 438 is inputted to a scan line and selects each row. A signal current is sequentially supplied from a signal line to a pixel which is controlled by the selected scan line.

Note that a level shifter circuit may be disposed between the shift register 437 and the buffer 438. By disposing the level shifter circuit, a voltage amplitude can be higher.

Further, current sources provided in the signal line driver circuit of the invention do not have to be disposed in alignment, but may be disposed to misaligned in the signal line driver circuit. Moreover, two signal line driver circuits may be provided symmetrically to a pixel portion. In the signal line driver circuits provided symmetrically in this manner, the numbers of current source circuit or the other circuit, and wiring of the signal line driver circuit are reduced by half, therefore, a density of the circuits to one another is reduced by half as well. Thus, production yield can be improved. That is to say, the signal line driver circuit of the invention is not limited in the alignments of current source circuit or signal line connected thereto as long as the signal line driver circuit is connected to the current source circuit and the signal line through the changing over means.

[Embodiment 2]

In this embodiment, devices in the case of performing a color display are described.

In the case where a light emitting element is an organic EL element, it is sometimes the case that the luminance varies depending on color even when the same amount of current is supplied to the light emitting element. Further, in the case where the light emitting element decays over time or due to other reasons, the degree of the decay varies depending on color. Therefore, when performing a color display by a light emitting device using a light emitting element, various devices are required in order to control the white balance.

The simplest way is to change the amount of current to be inputted to the pixel depending on color. In order to do that, the amount of current of a reference constant current source may be changed depending on color.

One of the other ways is to use the circuits shown in FIGS. 3(C) to 3(E) in the pixel, signal line driver circuit, reference constant current source and the like. In the circuits shown in FIGS. 3(C) to 3(E), the ratio of W/L of two transistors forming a current mirror circuit is changed depending on color. Thus, the amount of current to be inputted to the pixel can be changed depending on color.

Furthermore, another way is to change the length of light emission period depending on color. This way can be applied to both the case of using a time gray scale method and the case without the time gray scale method. According to this way, luminance of each pixel can be controlled.

By using one of the aforementioned ways or in combination, the white balance can be easily controlled.

[Embodiment 3]

Figure 18:
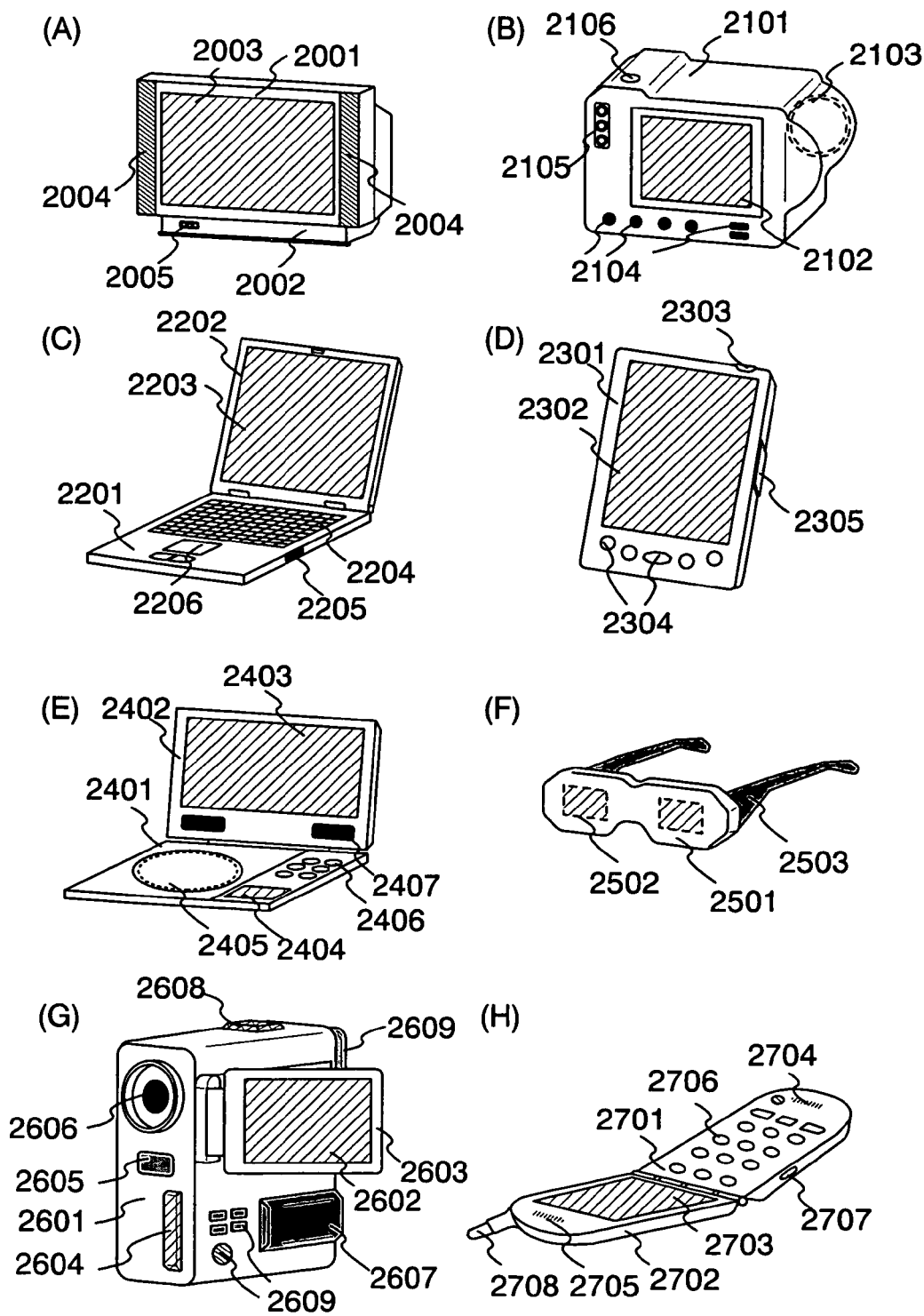
FIG. 18 is views of electronic apparatuses to which the light emitting device of the invention is applied.

Electronic apparatuses using the light emitting device of the invention include a video camera, a digital camera, a goggle type display (head mounted display), a navigation system, an audio reproducing apparatus (a car audio, an audio component system and the like), a notebook type personal computer, a game machine, a portable information terminal (a mobile computer, a portable phone, a portable game machine, an electronic book and the like), an image reproducing apparatus provided with a recording medium (specifically, apparatus provided with a display device capable of reproducing the recording medium such as a Digital Versatile Disk (DVD), etc. and displaying the image thereof) and the like. In particular, the portable information terminal which is often viewed at an oblique angle is preferable to be applied a light emitting device because of emphasis on a width of viewing angle. Specific examples of these electronic apparatuses are shown in FIG. 18.

FIG. 18(A) illustrates a light emitting device including a housing 2001, a support base 2002, a display portion 2003, speaker portions 2004, a video input terminal 2005 and the like. The light emitting device of the invention can be used in the display portion 2003. According to the invention, the light emitting device shown in FIG. 18(A) is completed. The light emitting device is a self-luminous type, therefore, it does not require a backlight, which allows the display portion to be thinner than a liquid crystal display. Note that the light emitting device refers to all light emitting devices for displaying information, including ones for personal computers, for TV broadcasting reception, and for advertisement.

FIG. 18(B) illustrates a digital still camera including a body 2101, a display portion 2102, an image receiving portion 2103, operating keys 2104, an external connecting port 2105, a shutter 2106 and the like. The light emitting device of the invention can be used in the display portion 2102.

FIG. 18(C) illustrates a notebook type personal computer including a body 2201, a housing 2202, a display portion 2203, a keyboard 2204, an external connecting port 2205, a pointing mouse 2206 and the like. The light emitting device of the invention can be used in the display portion 2203.

FIG. 18(D) illustrates a mobile computer including a body 2301, a display portion 2302, a switch 2303, an operating key 2304, an infrared port 2305 and the like. The light emitting device of the invention can be used in the display portion 2302.

FIG. 18(E) illustrates a portable image reproducing apparatus (specifically a DVD reproducing apparatus) provided with a recording medium, including a body 2401, a housing 2402, a display portion A 2403, a display portion B 2404, a recording medium (such as DVD) reading portion 2405, an operating key 2406, a speaker portion 2407 and the like. The display portion A 2403 mainly displays image data while the display portion B 2404 mainly displays text data. The light emitting device of the invention can be used in both of the display portions A, B 2403 and 2404. Note that the image reproducing apparatus provided with a recording medium includes a home game machine and the like.

FIG. 18(F) illustrates a goggle type display (head mounted display) including a body 2501, a display portion 2502, and an arm portion 2503. The light emitting device of the invention can be used in the display portion 2502.

FIG. 18(G) illustrates a video camera including a body 2601, a display portion 2602, a housing 2603, an external connecting port 2604, a remote control receiving portion 2605, an image receiving portion 2606, a battery 2607, an audio input portion 2608, operating keys 2609 and the like. The light emitting device of the invention can be used in the display portion 2602.

Here, FIG. 18(H) illustrates a portable phone including a body 2701, a housing 2702, a display portion 2703, an audio input portion 2704, an audio output portion 2705, an operating key 2706, an external connecting port 2707, an antenna 2708 and the like the light emitting device of the invention can be used in the display portion 2703. Note that current consumption of the portable phone can be suppressed by displaying white text on a black background.

Provided that a light emission luminance of a light emitting material becomes high in the future, the light including outputted image data can be expanded and projected to be used for a front or rear projector.

Furthermore, the aforementioned electronic apparatuses are becoming to be used for displaying information distributed through a telecommunication path such as Internet, a CATI (cable television system), and in particular for displaying moving picture information. The display device is suitable for displaying moving pictures since the light emitting material can exhibit high response speed.

It is preferable to display data with as small light emitting portion as possible because the light emitting device consumes power in the light emitting portion. Therefore, in the case of using the light emitting device in the display portions of the portable information terminal, in particular a portable phone or an audio reproducing device which mainly display text data, it is preferable to drive so that the text data is formed by a light emitting portion with a non-light emitting portion as a background.

As described above, the application range of the invention is quite wide and the invention can be used in various fields of electronic apparatuses. The electronic apparatuses described in this embodiment can use any of the configuration of the signal line driver circuits and the pixel configurations described in Embodiment Modes 1 to 13.

The invention claimed is:

1. A signal line driver circuit comprising:
a shift register;
a latch circuit, electrically connected to the shift register, comprising a plurality of unit circuits, wherein each of the plurality of unit circuits comprises:
   a pair of current source circuits, wherein each of the pair of current source circuits is configured to receive a set signal and a signal current, and to control a value of an output current depending on a value of the signal current;
   a first switch, wherein the first switch is configured to select a current source circuit from the pair of current source circuits for receiving the signal current; and
   a second switch, wherein the second switch is configured to select a current source circuit from the pair of current source circuits for outputting the output current; and
a changing over circuit electrically connected to the plurality of unit circuits and a plurality of signal lines,
wherein the changing over circuit is configured to select one unit circuit from the plurality of unit circuits for electrically connecting to each of the plurality of signal lines, and
wherein the shift register is configured to output the set signal.

2. The signal line driver circuit according to claim 1,
wherein each of the pair of current source circuits includes a transistor having a gate, a source and a drain and a capacitor having one electrode electrically connected to the source of the transistor and the other electrode electrically connected to the gate of the transistor, and
wherein each of the pair of current source circuits is configured to control the value of the output current depending on a voltage between the gate and the source of the transistor of the pair of current source circuits that is generated by supplying the signal current to the transistor while the gate and the drain of the transistor are electrically connected to each other.

3. The signal line driver circuit according to claim 1,
wherein each of the pair of current source circuits includes a transistor having a gate, a source and a drain and a capacitor having one electrode electrically connected to the source of the transistor and the other electrode electrically connected to the gate of the transistor, and
wherein each of the pair of current source circuits is configured to control the value of the output current depending on a voltage between the gate and the source of the transistor of the pair of current source circuits that is generated by supplying the signal current to the transistor while the gate and the drain of the transistor are electrically connected to each other.

4. A signal line driver circuit comprising:
a shift register;
a latch circuit, electrically connected to the shift register, comprising a plurality of unit circuits, wherein each of the plurality of unit circuits comprises:
   a pair of current source circuits, wherein each of the pair of current source circuits is configured to receive a set signal and a signal current, and to control a value of an output current depending on a value of the signal current;
   a first switch provided between the shift register and each of the pair of current source circuits, the first switch being configured to select a current source circuit from the pair of current source circuits for receiving the signal current; and
   a second switch, the second switch being configured to select a current source circuit from the pair of current source circuits for outputting the output current, and
a changing over circuit electrically connected between the plurality of unit circuits and a plurality of signal lines,
wherein the changing over circuit is electrically connected to a particular unit circuit through the second switch,
wherein the changing over circuit is configured to select one unit circuit from the plurality of unit circuits for electrically connecting to each of the plurality of signal lines,
wherein the shift register is configured to output the set signal, and
wherein the first and second switches are configured to be controlled based on a same latch pulse.

5. The signal line driver circuit according to claim 4,
wherein each of the pair of current source circuits includes a transistor having a gate, a source and a drain and a capacitor having one electrode electrically connected to the source of the transistor and the other electrode electrically connected to the gate of the transistor, and wherein each of the pair of current source circuits is configured to control the value of the output current depending on a voltage between the gate and the source of the transistor of the pair of current source circuits that is generated by supplying the signal current to the transistor while the gate and the drain of the transistor are electrically connected to each other.

6. The signal line driver circuit according to claim 4, wherein each of the pair of current source circuits includes a transistor having a gate, a source and a drain and a capacitor having one electrode electrically connected to the source of the transistor and the other electrode electrically connected to the gate of the transistor, and wherein each of the pair of current source circuits is configured to control the value of the output current depending on a voltage between the gate and the source of the transistor of the pair of current source circuits that is generated by supplying the signal current to the transistor while the gate and the drain of the transistor are electrically connected to each other.

7. A signal line driver circuit comprising:

a latch circuit comprising a plurality of unit circuits, wherein each of the plurality of unit circuits comprises:
  a pair of current source circuits, wherein each of the pair of current source circuits is configured to receive a set signal and a signal current, and to control a value of an output current depending on a value of the signal current;
  a first switch, wherein the first switch is configured to select a current source circuit from the pair of current source circuits for receiving the signal current; and
  a second switch, wherein the second switch is configured to select a current source circuit from the pair of current source circuits for outputting the output current; and a changing over circuit electrically connected to the plurality of unit circuits and a plurality of signal lines, wherein the changing over circuit is configured to select one unit circuit from the plurality of unit circuits for electrically connecting to each of the plurality of signal lines.

8. A signal line driver circuit comprising:

a latch circuit comprising a plurality of unit circuits, wherein each of the plurality of unit circuits comprises:
  a pair of current source circuits, wherein each of the pair of current source circuits is configured to receive a set signal and a signal current, and to control a value of an output current depending on a value of the signal current;
  a first switch, the first switch being configured to select a current source circuit from the pair of current source circuits for receiving the signal current; and
  a second switch, the second switch being configured to select a current source circuit from the pair of current source circuits for outputting the output current, and a changing over circuit electrically connected between the plurality of unit circuits and a plurality of signal lines, wherein the changing over circuit is electrically connected to a particular unit circuit through the second switch, wherein the changing over circuit is configured to select one unit circuit from the plurality of unit circuits for electrically connecting to each of the plurality of signal lines, and wherein the first and second switches are configured to be controlled based on a same latch pulse.

* * * * *